United States Patent
Gokhale et al.

(10) Patent No.: US 8,402,000 B2
(45) Date of Patent: Mar. 19, 2013

(54) SYSTEMS AND METHODS OF MEDIA MANAGEMENT, SUCH AS MANAGEMENT OF MEDIA TO AND FROM A MEDIA STORAGE LIBRARY

(75) Inventors: Parag Gokhale, Ocean, NJ (US); Rajiv Kottomtharayil, Malboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 961 days.

(21) Appl. No.: 12/060,169

(22) Filed: Mar. 31, 2008

(65) Prior Publication Data

US 2008/0249656 A1    Oct. 9, 2008

Related U.S. Application Data

(63) Continuation of application No. 11/694,748, filed on Mar. 30, 2007.

(60) Provisional application No. 60/871,730, filed on Dec. 22, 2006.

(51) Int. Cl.
G06F 7/00 (2006.01)
G06F 17/00 (2006.01)

(52) U.S. Cl. ........ 707/674; 707/676; 707/679; 707/690; 711/161; 711/162

(58) Field of Classification Search .................. None
See application file for complete search history.

(56) References Cited

U.S. PATENT DOCUMENTS

| | | | |
|---|---|---|---|
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,265,159 A | 11/1993 | Kung | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,412,668 A | 5/1995 | Dewey | |
| 5,448,724 A | 9/1995 | Hayashi et al. | |
| 5,455,926 A * | 10/1995 | Keele et al. | 711/4 |

(Continued)

FOREIGN PATENT DOCUMENTS

EP    0259912    3/1988
EP    0405926    1/1991

(Continued)

OTHER PUBLICATIONS

U.S. Appl. No. 11/694,748, filed Mar. 30, 2007, Gokhale et al.

(Continued)

*Primary Examiner* — Angelica Ruiz
(74) *Attorney, Agent, or Firm* — Perkins Coie LLP

(57) ABSTRACT

A system and method for determining media to be exported out of a media library is described. In some examples, the system determines a media component to be exported, determines the media component is in the media library for a specific process, and exports the media component after the process is completed.

21 Claims, 14 Drawing Sheets

U.S. PATENT DOCUMENTS

| | | |
|---|---|---|
| 5,491,810 A | 2/1996 | Allen |
| 5,495,457 A | 2/1996 | Takagi et al. |
| 5,495,607 A | 2/1996 | Pisello et al. |
| 5,499,364 A | 3/1996 | Klein et al. |
| 5,504,873 A | 4/1996 | Martin et al. |
| 5,506,986 A | 4/1996 | Healy |
| 5,544,345 A | 8/1996 | Carpenter et al. |
| 5,544,347 A | 8/1996 | Yanai et al. |
| 5,548,521 A | 8/1996 | Krayer et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,815,662 A | 9/1998 | Ong |
| 5,832,522 A | 11/1998 | Blickenstaff et al. |
| 5,860,068 A * | 1/1999 | Cook ............................. 705/26 |
| 5,875,478 A | 2/1999 | Blumenau |
| 5,875,481 A | 2/1999 | Ashton et al. |
| 5,887,134 A | 3/1999 | Ebrahim |
| 5,893,139 A | 4/1999 | Kamiyama et al. |
| 5,898,593 A | 4/1999 | Baca et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 5,978,577 A | 11/1999 | Rierden et al. |
| 6,021,415 A | 2/2000 | Cannon et al. |
| 6,026,398 A | 2/2000 | Brown et al. |
| 6,026,414 A | 2/2000 | Anglin |
| 6,052,735 A | 4/2000 | Ulrich et al. |
| 6,076,148 A | 6/2000 | Kedem et al. |
| 6,088,694 A | 7/2000 | Burns et al. |
| 6,094,416 A | 7/2000 | Ying |
| 6,131,095 A | 10/2000 | Low et al. |
| 6,131,147 A | 10/2000 | Takagi |
| 6,131,190 A | 10/2000 | Sidwell |
| 6,137,864 A | 10/2000 | Yaker |
| 6,148,412 A | 11/2000 | Cannon et al. |
| 6,154,738 A * | 11/2000 | Call ............................. 705/20 |
| 6,154,787 A | 11/2000 | Urevig et al. |
| 6,161,111 A | 12/2000 | Mutalik et al. |
| 6,167,402 A | 12/2000 | Yeager |
| 6,195,794 B1 | 2/2001 | Buxton |
| 6,212,512 B1 | 4/2001 | Barney et al. |
| 6,246,882 B1 | 6/2001 | Lachance |
| 6,260,069 B1 | 7/2001 | Anglin |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton et al. |
| 6,330,572 B1 | 12/2001 | Sitka |
| 6,330,642 B1 | 12/2001 | Carteau |
| 6,338,006 B1 | 1/2002 | Jesionowski et al. |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,900 B1 | 4/2002 | Hu |
| 6,374,336 B1 | 4/2002 | Peters et al. |
| 6,389,432 B1 | 5/2002 | Pothapragada et al. |
| 6,418,441 B1 * | 7/2002 | Call ............................. 705/23 |
| 6,418,478 B1 | 7/2002 | Ignatius et al. |
| 6,421,711 B1 | 7/2002 | Blumenau et al. |
| 6,434,682 B1 | 8/2002 | Ashton et al. |
| 6,457,017 B2 | 9/2002 | Watkins et al. |
| 6,484,166 B1 | 11/2002 | Maynard |
| 6,487,561 B1 | 11/2002 | Ofek et al. |
| 6,490,666 B1 | 12/2002 | Cabrera et al. |
| 6,496,744 B1 * | 12/2002 | Cook ............................. 700/95 |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,658,436 B2 | 12/2003 | Oshinsky et al. |
| 6,658,526 B2 | 12/2003 | Nguyen et al. |
| 6,669,832 B1 | 12/2003 | Saito et al. |
| 6,674,924 B2 | 1/2004 | Wright et al. |
| 6,721,334 B1 | 4/2004 | Ketcham |
| 6,757,794 B2 | 6/2004 | Cabrera et al. |
| 6,771,595 B1 | 8/2004 | Gilbert et al. |
| 6,789,161 B1 | 9/2004 | Blendermann et al. |
| 6,802,025 B1 | 10/2004 | Thomas et al. |
| 6,820,035 B1 | 11/2004 | Zahavi |
| 6,851,031 B2 | 2/2005 | Trimmer et al. |
| 6,909,356 B2 | 6/2005 | Brown et al. |
| 6,934,879 B2 | 8/2005 | Misra et al. |
| 6,941,370 B2 | 9/2005 | Boies et al. |
| 6,950,723 B2 | 9/2005 | Gallo et al. |
| 6,968,351 B2 | 11/2005 | Butterworth |
| 6,973,369 B2 | 12/2005 | Trimmer et al. |
| 6,973,553 B1 | 12/2005 | Archibald, Jr. et al. |
| 6,983,351 B2 | 1/2006 | Gibble et al. |
| 7,006,435 B1 | 2/2006 | Davies et al. |
| 7,010,387 B2 | 3/2006 | Lantry et al. |
| 7,012,529 B2 | 3/2006 | Sajkowsky |
| 7,034,683 B2 | 4/2006 | Ghazarian |
| 7,035,880 B1 | 4/2006 | Crescenti et al. |
| 7,058,649 B2 | 6/2006 | Ough et al. |
| 7,069,466 B2 | 6/2006 | Trimmer et al. |
| 7,082,441 B1 | 7/2006 | Zahavi et al. |
| 7,085,786 B2 | 8/2006 | Carlson et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,619 B1 | 9/2006 | Rajpurkar et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,118,034 B2 | 10/2006 | Baldassari et al. |
| 7,120,823 B2 | 10/2006 | Foster et al. |
| 7,130,970 B2 | 10/2006 | Devassy et al. |
| 7,136,720 B2 | 11/2006 | Deckers |
| 7,146,377 B2 | 12/2006 | Nowicki et al. |
| 7,155,465 B2 | 12/2006 | Lee et al. |
| 7,162,496 B2 | 1/2007 | Amarendran et al. |
| 7,162,604 B1 | 1/2007 | Nourmohamadian et al. |
| 7,162,693 B2 | 1/2007 | Yamanaka et al. |
| 7,191,283 B2 | 3/2007 | Amemiya et al. |
| 7,197,490 B1 | 3/2007 | English |
| 7,200,621 B2 | 4/2007 | Beck et al. |
| 7,203,944 B1 | 4/2007 | van Rietschote et al. |
| 7,209,949 B2 | 4/2007 | Mousseau et al. |
| 7,213,118 B2 | 5/2007 | Goodman et al. |
| 7,216,244 B2 | 5/2007 | Amano |
| 7,246,140 B2 | 7/2007 | Therrien et al. |
| 7,246,207 B2 | 7/2007 | Kottomtharayil et al. |
| 7,246,258 B2 | 7/2007 | Chen et al. |
| 7,277,246 B2 | 10/2007 | Barbian et al. |
| 7,277,953 B2 | 10/2007 | Wils et al. |
| 7,281,032 B2 | 10/2007 | Kodama |
| 7,287,047 B2 | 10/2007 | Kavuri |
| 7,293,133 B1 | 11/2007 | Colgrove et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |

| | | |
|---|---|---|
| 7,379,850 B2 | 5/2008 | Sprogis et al. |
| 7,395,282 B1 | 7/2008 | Crescenti et al. |
| 7,395,387 B2 | 7/2008 | Berkowitz et al. |
| 7,401,728 B2 | 7/2008 | Markham et al. |
| 7,434,090 B2 | 10/2008 | Hartung et al. |
| 7,447,907 B2 | 11/2008 | Hart, III et al. |
| 7,454,569 B2 | 11/2008 | Kavuri et al. |
| 7,467,167 B2 | 12/2008 | Patterson |
| 7,472,238 B1 | 12/2008 | Gokhale et al. |
| 7,500,053 B1 | 3/2009 | Kavuri et al. |
| 7,539,702 B2 | 5/2009 | Deshmukh et al. |
| 7,581,011 B2 | 8/2009 | Teng |
| 7,584,227 B2 | 9/2009 | Gokhale et al. |
| 7,584,298 B2 | 9/2009 | Klinker et al. |
| 7,587,749 B2 | 9/2009 | Leser et al. |
| 7,596,586 B2 | 9/2009 | Gokhale et al. |
| 7,603,518 B2 | 10/2009 | Kottomtharayil |
| 7,644,245 B2 | 1/2010 | Prahlad et al. |
| 7,659,820 B2* | 2/2010 | Schnee et al. .............. 340/572.1 |
| 7,660,812 B2* | 2/2010 | Findlay et al. ......... 707/999.102 |
| 7,689,510 B2 | 3/2010 | Lamkin et al. |
| 7,702,659 B2 | 4/2010 | Ban et al. |
| 7,707,060 B2 | 4/2010 | Chainer et al. |
| 7,739,450 B2 | 6/2010 | Kottomtharayil |
| 7,748,610 B2 | 7/2010 | Bell et al. |
| 7,765,167 B2 | 7/2010 | Prahlad et al. |
| 7,765,369 B1 | 7/2010 | Prahlad et al. |
| 7,805,416 B1 | 9/2010 | Compton et al. |
| 7,809,699 B2 | 10/2010 | Passmore et al. |
| 7,809,914 B2 | 10/2010 | Kottomtharayil et al. |
| 7,818,417 B2 | 10/2010 | Ginis et al. |
| 7,831,566 B2 | 11/2010 | Kavuri et al. |
| 7,849,266 B2 | 12/2010 | Kavuri et al. |
| 7,873,802 B2 | 1/2011 | Gokhale et al. |
| 7,877,351 B2 | 1/2011 | Crescenti et al. |
| 7,877,362 B2 | 1/2011 | Gokhale et al. |
| 7,890,796 B2 | 2/2011 | Pawar et al. |
| 7,917,473 B2 | 3/2011 | Kavuri et al. |
| 7,975,061 B1 | 7/2011 | Gokhale et al. |
| 7,987,319 B2 | 7/2011 | Kottomtharayil |
| 2002/0010661 A1* | 1/2002 | Waddington et al. ........... 705/28 |
| 2002/0049778 A1 | 4/2002 | Bell et al. |
| 2002/0069324 A1 | 6/2002 | Gerasimov et al. |
| 2002/0139859 A1* | 10/2002 | Catan ....................... 235/472.02 |
| 2003/0018546 A1* | 1/2003 | Ayala et al. ...................... 705/28 |
| 2003/0055671 A1 | 3/2003 | Nassar |
| 2003/0065759 A1 | 4/2003 | Britt et al. |
| 2003/0101155 A1 | 5/2003 | Gokhale et al. |
| 2003/0120677 A1* | 6/2003 | Vernon .......................... 707/102 |
| 2003/0134619 A1 | 7/2003 | Phillips et al. |
| 2003/0172325 A1* | 9/2003 | Wyatt et al. ...................... 714/53 |
| 2003/0220901 A1 | 11/2003 | Carr et al. |
| 2003/0227392 A1 | 12/2003 | Ebert et al. |
| 2003/0227707 A1 | 12/2003 | Kokami et al. |
| 2004/0054607 A1* | 3/2004 | Waddington et al. ........... 705/28 |
| 2004/0083202 A1 | 4/2004 | Mu et al. |
| 2004/0107199 A1 | 6/2004 | Dalrymple et al. |
| 2004/0186847 A1* | 9/2004 | Rappaport et al. ............. 707/101 |
| 2004/0193953 A1 | 9/2004 | Callahan et al. |
| 2004/0204949 A1 | 10/2004 | Shaji et al. |
| 2005/0008163 A1 | 1/2005 | Leser et al. |
| 2005/0013149 A1 | 1/2005 | Trossell |
| 2005/0021524 A1 | 1/2005 | Oliver |
| 2005/0033913 A1 | 2/2005 | Kottomtharayil et al. |
| 2005/0039069 A1 | 2/2005 | Prahlad et al. |
| 2005/0102203 A1 | 5/2005 | Keong |
| 2005/0174869 A1 | 8/2005 | Kottomtharayil et al. |
| 2005/0177828 A1 | 8/2005 | Graham et al. |
| 2005/0187992 A1 | 8/2005 | Prahlad et al. |
| 2005/0195660 A1 | 9/2005 | Kavuri et al. |
| 2005/0246342 A1* | 11/2005 | Vernon .............................. 707/9 |
| 2006/0004639 A1 | 1/2006 | O'Keefe |
| 2006/0004675 A1 | 1/2006 | Bennett et al. |
| 2006/0011720 A1* | 1/2006 | Call ............................... 235/383 |
| 2006/0095385 A1 | 5/2006 | Atkinson et al. |
| 2006/0095525 A1 | 5/2006 | Mousseau et al. |
| 2006/0161879 A1 | 7/2006 | Lubrecht et al. |
| 2006/0169769 A1 | 8/2006 | Boyarsky et al. |
| 2006/0224846 A1 | 10/2006 | Amarendran et al. |
| 2006/0248165 A1 | 11/2006 | Sridhar et al. |
| 2006/0282194 A1 | 12/2006 | Schaefer et al. |
| 2006/0285172 A1* | 12/2006 | Hull et al. ...................... 358/448 |
| 2007/0055686 A1* | 3/2007 | Findlay et al. ................ 707/102 |
| 2007/0130105 A1 | 6/2007 | Papatla |
| 2007/0150888 A1 | 6/2007 | Shapiro |
| 2007/0156897 A1 | 7/2007 | Lim |
| 2007/0162359 A1 | 7/2007 | Gokhale et al. |
| 2007/0185912 A1 | 8/2007 | Gupta et al. |
| 2007/0198722 A1 | 8/2007 | Kottomtharayil et al. |
| 2007/0198802 A1 | 8/2007 | Kavuri |
| 2007/0266062 A1 | 11/2007 | Young |
| 2008/0059704 A1 | 3/2008 | Kavuri |
| 2008/0077715 A1 | 3/2008 | Kochunni et al. |
| 2008/0126704 A1 | 5/2008 | Ulrich et al. |
| 2008/0141242 A1 | 6/2008 | Shapiro |
| 2008/0229037 A1 | 9/2008 | Bunte et al. |
| 2008/0244177 A1 | 10/2008 | Crescenti et al. |
| 2008/0249996 A1 | 10/2008 | Prahlad et al. |
| 2009/0063765 A1 | 3/2009 | Kottomtharayil et al. |
| 2009/0089499 A1 | 4/2009 | Abe |
| 2009/0113056 A1 | 4/2009 | Tameshige et al. |
| 2009/0300412 A1 | 12/2009 | Soran et al. |
| 2009/0313448 A1 | 12/2009 | Gokhale et al. |
| 2010/0030528 A1* | 2/2010 | Smith et al. ........................ 703/1 |
| 2010/0070466 A1 | 3/2010 | Prahlad et al. |
| 2010/0070474 A1 | 3/2010 | Lad |
| 2010/0138393 A1 | 6/2010 | Crescenti et al. |
| 2011/0093672 A1 | 4/2011 | Gokhale et al. |
| 2011/0213755 A1 | 9/2011 | Kavuri et al. |
| 2011/0231852 A1 | 9/2011 | Gokhale et al. |
| 2011/0270859 A1 | 11/2011 | Kottomtharayil |

FOREIGN PATENT DOCUMENTS

| | | |
|---|---|---|
| EP | 0467546 | 1/1992 |
| EP | 0620553 | 10/1994 |
| EP | 0774715 | 5/1997 |
| EP | 0809184 | 11/1997 |
| EP | 0899662 | 3/1999 |
| EP | 0981090 | 2/2000 |
| JP | 7254204 | 10/1995 |
| JP | 9044381 | 2/1997 |
| JP | 9081424 | 3/1997 |
| WO | WO-95/13580 | 5/1995 |
| WO | WO-99/12098 | 3/1999 |
| WO | WO-2005/024573 | 3/2005 |

OTHER PUBLICATIONS

U.S. Appl. No. 12/058,467, filed Mar. 28, 2008, Kottomtharayil.
U.S. Appl. No. 12/060,160, filed Mar. 31, 2008, Gokhale et al.
U.S. Appl. No. 12/060,175, filed Mar. 31, 2008, Muller.
U.S. Appl. No. 12/060,181, filed Mar. 31, 2008, Muller.
Carrington D: "Backups Using The "at" Command", Internet Publication, [Online] May 4, 1999, Retrieved from the Internet: URL: <http://groups.google.de/group/microsoft.public.windowsnt.misc/browse_thread/thread/d1406a9a8391afea/48bac300a0adcc7a?Ink=st&q=&rnum=12 &hl=de#48bac300a0adcc7a> [retrieved on Aug. 22, 2006].
Campbell C: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006].
Cook P: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?Ink=st&q=%22ntbackup+eject%22+at &rnum=1&hl=de#0ab1d93a6f91b511> [retrieved on Aug. 22, 2006].
Savill J: "Windows NT FAQ Single File Version—Section Backup's" Internet Publication, [Online] 2000, Retrieved from Internet: URL: <http://burks.bton.ac.uk/burks/pcinfo/osdocs/ntfaq/ntfaq_09.htm> [retrieved on Aug. 22, 2006].
MDM: "Automatically eject tape", Internet Publication, [Online] Jun. 7, 1999, Retrieved from Internet: URL:<http://groups.google.de/group/microsoft.public.windowsnt.misc/browse$_{13}$ thread/thread/

66537271a88cebda/2f8b1b96dfc5f102?Ink=st&q=&rnum=11&hl=de#2f8b1b96dfc5f102> [retrieved on Jun. 22, 2006].

First Office Action for Japanese Application No. 2003-548129, Mail Date Sep. 2, 2008, 4 pages.

U.S. Appl. No. 12/648,569, filed Dec. 29, 2009, Kottomtharayil et al.

Non-Final Office Action for U.S. Appl. No. 11/694,803, Mail Date Jan. 22, 2009, 18 pages.

Non-Final Office Action for U.S. Appl. No. 09/991,900, Mail Date Aug. 18, 2008, 10 pages.

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Final Office Action for U.S. Appl. No. 09/991,900, Mail Date May 18, 2009, 15 pages.

U.S. Appl. No. 12/844,665, filed Jul. 27, 2010, Prahlad et al.

Exam Report for EP Application No. 05745272.4, Mail Date Jun. 28, 2010, 6 pages.

U.S. Appl. No. 10/655,764, Nourohamadian et al.

U.S. Appl. No. 11/269,513, filed Nov. 7, 2005, Prahlad et al.

Recycle Bin (Windows), Aug. 2007, Wikipedia, pp. 1-3.

Ashton et al., "Two Decades of policy-based storage management for the IBM mainframe computer", www.research.ibm.com, 19 pages, published Apr. 10, 2003, printed Jan. 3, 2009.

Gonzalez-Seco, Jose, "A Genetic Algorithm as the Learning Procedure for Neural Networks," International Joint Conference on Neural Networks, Jun. 1992, 356 pages.

U.S. Appl. No. 09/609,977, filed Jul. 5, 2000.

Allen, "Probablility, Statistics and Queuing Theory," (1978), p. 370, col. 19, Lines 3-33, 1 page.

* cited by examiner

SYSTEMS AND METHODS OF MEDIA MANAGEMENT, SUCH AS MANAGEMENT OF MEDIA TO AND FROM A MEDIA STORAGE LIBRARY

CROSS-REFERENCE TO RELATED APPLICATION(S)

This is a continuation application of U.S. patent application Ser. No. 11/694,748, filed Mar. 30, 2007, which claims priority to U.S. Provisional Patent Application No. 60/871,730, filed Dec. 22, 2006, each of which is herein incorporated by reference in its entirety. This application is further related to the following patents and pending U.S. applications, each of which is hereby incorporated herein by reference in its entirety:

U.S. patent application Ser. No. 09/991,900, filed Nov. 23, 2001, entitled METHOD AND SYSTEM FOR SCHEDULING MEDIA EXPORTS, U.S. patent application Ser. No. 10/819,102, filed Apr. 5, 2004, entitled METHOD AND SYSTEM FOR CONTROLLING A ROBOTIC ARM IN A STORAGE DEVICE, U.S. patent application Ser. No. 10/818,750, filed Apr. 5, 2004, entitled SYSTEM AND METHOD FOR EXTENDED MEDIA RETENTION, U.S. patent application Ser. No. 11/313,267, filed Dec. 19, 2005, entitled SYSTEMS AND METHODS FOR IMPROVED MEDIA IDENTIFICATION IN A STORAGE DEVICE, and U.S. patent application Ser. No. 11/313,256, filed Dec. 19, 2005, entitled SYSTEMS AND METHODS FOR CONTAINERIZED DATA STORAGE AND TRACKING.

BACKGROUND

Data storage systems interact with media libraries in data storage and retrieval operations. Media libraries house and control physical media (magnetic tapes, optical disks, and so on) that is used during storage operations, such as data storage operations. Libraries are limited in the number of media components they are able to hold, in many cases due to the physical size of the library. Therefore, a data storage system may need to transfer media components out of the library that are no longer needed or useful for data storage (e.g., media components at their storage capacity, or media components scheduled for offsite archiving), and bring in new media components for future storage operations.

Data storage systems may employ management systems to track the movement of media components to and from media libraries. Periodically, the systems transfer media components to offsite storage locations, such as media components no longer needed or useful for the system at certain times. Management systems may track the movement or location of media components used by a data storage system.

The management systems typically rely on policies that instruct the management systems as to the location of media components and the time at which to transfer media components to a determined location. However, the policies may be somewhat inflexible and lack insight into the needs of a data storage system or its policies, and therefore may instruct the library to perform undesirable media component transfers.

Additionally, libraries may look to similarly rigid policies when ordering new media components to be used in the system. Again, typical data storage systems, using rigid media component ordering and buying policies, generally do not achieve a desirable balance between the needs of a system and the number of media components coming into the system to meet those needs. Some media components are expensive, and thus ordering too many can be costly. Alternatively, it can be detrimental to the system if too few media components are available for a given data store job.

Furthermore, media management systems are not able to control all aspects of media component transfers. Media components are likely to be transferred to offsite storage locations operated by other entities than an entity operating the data storage systems and media libraries. Additionally, new media components enter the system after being purchased from outside vendors. Because outside entities provide, and at time store, media components to the data storage systems, the management of media components may stop or be severely limited when the media components are not physically within or controlled by the system (e.g., when media components are stored offsite).

The foregoing examples of some existing limitations are intended to be illustrative and not exclusive. Other limitations will become apparent to those of skill in the art upon a reading of the Detailed Description below.

These and other problems exist with respect to media management systems.

Figure 1:
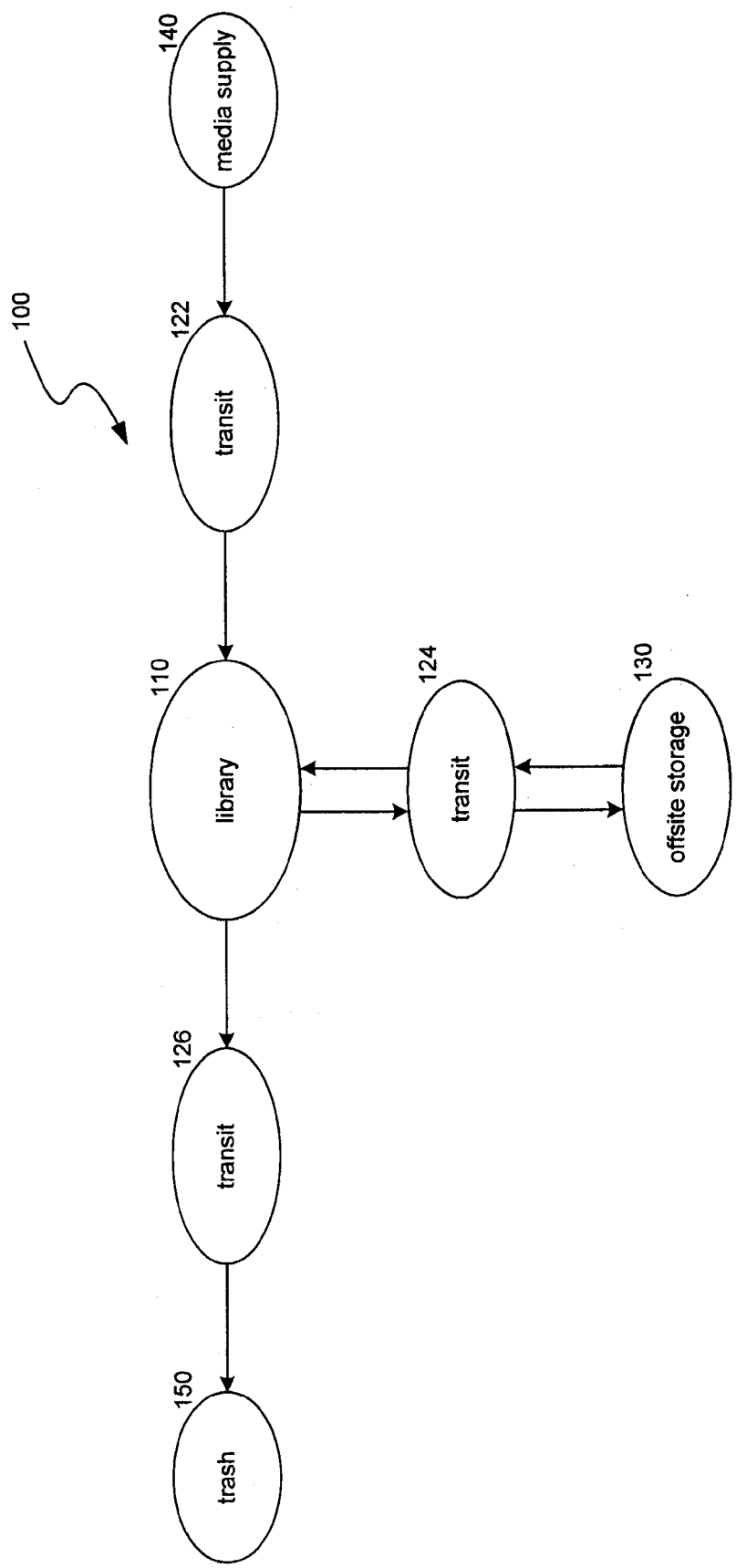
FIG. 1 is a block diagram illustrating an example of locations that house media components and the flow between such locations.

In the drawings, the same reference numbers and acronyms identify elements or acts with the same or similar functionality for ease of understanding and convenience. To easily identify the discussion of any particular element or act, the most significant digit or digits in a reference number refer to the Figure number in which that element is first introduced (e.g., element 1104 is first introduced and discussed with respect to FIG. 11).

COPYRIGHT NOTICE

A portion of the disclosure of this patent document contains material that is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

DETAILED DESCRIPTION

Examples of the technology are concerned with systems and methods that manage, direct, track, control, or facilitate the management or control of media to and from media storage libraries. Although described in connection with certain examples, the system described below is applicable to and may employ any wireless or hard-wired network or data transfer system that stores and conveys data from one point to another, including communication networks (such as LANs, WANs, the Internet), enterprise networks, storage networks, and so on.

Examples of the technology are directed to systems and methods that consider the needs, characteristics, or other attributes of a data storage system in the management of media components in a media storage library. In some examples, the system may retrieve a media component from an offsite storage location, transfer the media component to a media library, and provide a media library operator or automated library management system with information about the retrieved media component. In some examples, the system may consider the performance of a data storage system using the media library in determining how many media components to transfer into the media library. In some examples, the system verifies and tracks media components that are transferred into a media library from offsite locations.

Examples of the technology are directed to systems and methods that manage, control, direct, track, or facilitate the management or control of objects to and from storage facilities. Objects may include media components, shipping containers (such as envelopes, boxes, packages, and so on), consumer products (such as DVDs, CDs, books, electronics, and so on), rental products (such as rental DVDs, tapes, and so on), and other objects that may be stored in a facility (such as a storage facility with shelved storage) and may be transferred to and from the facility to other locations.

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

A block diagram 100 illustrating some of the locations associated with media storage and the flow or transport and travel between such locations is shown in FIG. 1. In diagram 100, media components, such as magnetic tapes, optical disks, grid computing elements, and other removable storage media, may be located in media library 110. Media library 110 may contain storage for multiple physical media and mechanisms (such as pickers, grippers, automated arms, and so on) that assist in handling and moving the media components around the library 110. Additionally, media library 110 may facilitate the storage of other types of media, as discussed herein.

Figure 2:
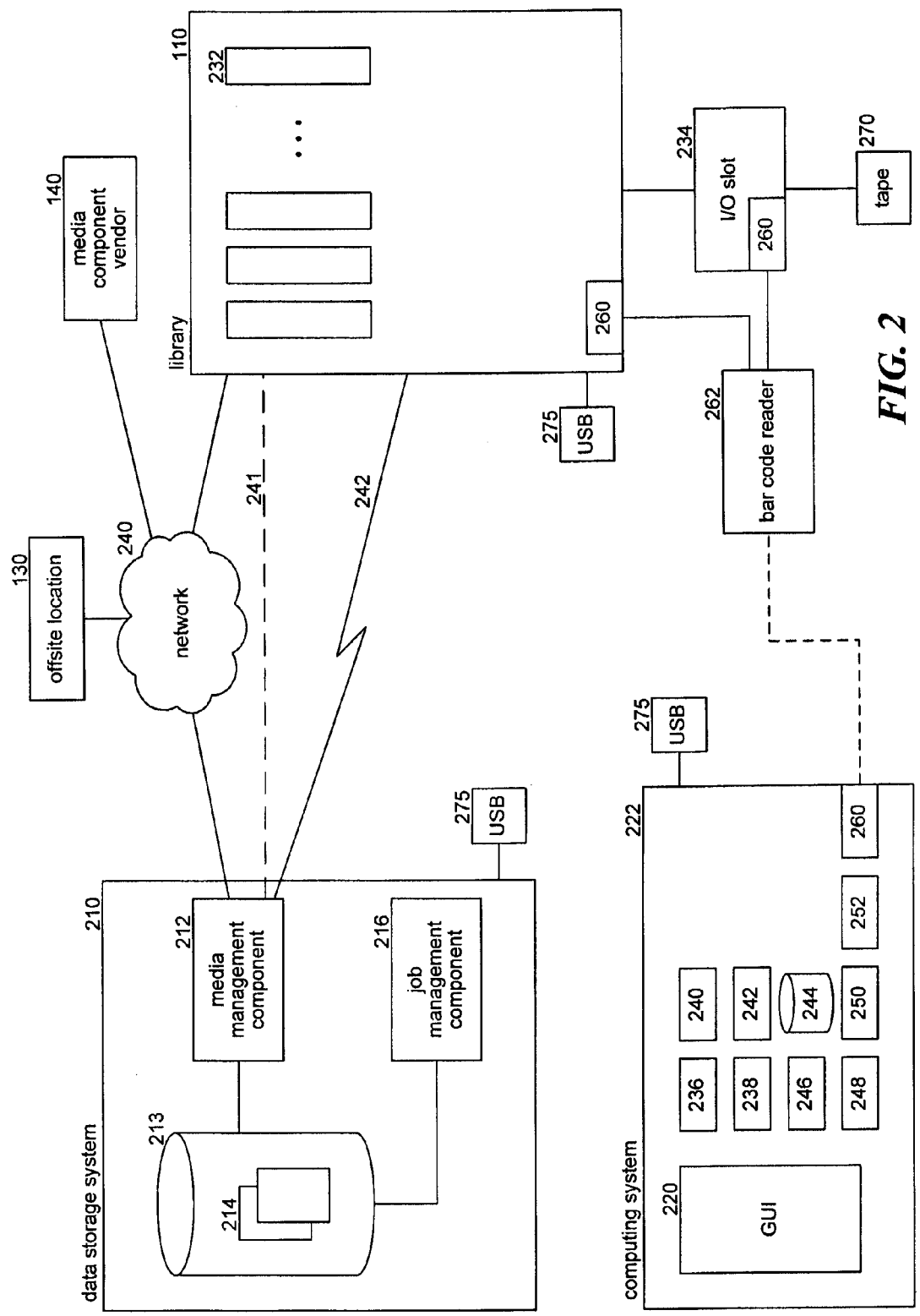
FIG. 2 is a block diagram illustrating an example of a data storage system.

Media components, such as tapes, may travel between media library 110 and any or all locations shown in FIG. 1. For example, the system may write (or, copy) data to a media component, such as a magnetic tape, and schedule a transfer of the tape to offsite storage location 130. Such transfer to offsite storage may be performed for a variety of reasons. In this example, the system tracks the tape's location from the library 110 to when the tape is in transit 124, to the offsite storage location 130. Also, the system may track a tape from storage location 130 back to the library 110. Additionally, the system may track new media components from an outside supplier 140, to the library 110, or even in transit 122 from the outside supplier 140. The outside 140 supplier may be a media vendor, a spare media pool, an additional or alternative library, a customer site, or other sources. Furthermore, the system may track media components as they leave the system 126 and are removed and either disposed, recycled, or otherwise destroyed at location 150. The assigned storage location can be any facility that stores or archives objects and the transit can refer to any method of moving the media component, such as a common courier, overnight delivery service, and so on. A block diagram illustrating an example data storage system is disclosed in FIG. 2. A data storage system 210 is connected to media library 110, and to a graphical user interface 220, such as an interface available via computing system 222. The data storage system may be a stand alone system or may be part of a complete storage management system. The data storage system 210 may be connected to the library 110 via a fixed connection 242, a wireless connection 241, or via a network 240 (such as the Internet, a private LAN, and so on). Other system components may also interact with the data storage system 210 via the network 240, a wireless connection or a direct connection, such as systems at offsite storage locations 130, systems at tape vendors 140 (such as a vendor management system), and so on.

As discussed above, the library 110 may contain multiple media components 232, such as magnetic tapes, optical disks, and so on. The library may also include or be connected to a receptacle or import/export slot 234 (such as a mail slot), whereby media components may be exported from the library or be received to be entered into the library.

The data storage system 210, via the computing system 222, may comprise an administration component 238 and/or an automation component 236 (e.g., modules, program code, and so on). An operator or administrator of the media library, via the computing system 222, may use components 236 and 238 to implement policies, verify media components within the library, or perform other management functions described herein. The system may also perform management functions automatically and/or dynamically by following default patterns, management policies, and so on. The library may contain a verification system 260, including a scanner 262 or other automated data capture device (e.g. bar code reader/scanner, radio frequency identification (RFID) reader, audio recorder, etc.). The verification system will be discussed in greater detail herein.

The computing system may also optionally include the verification system 260, comprising a scanner 262 or other automated data capture device (e.g. bar code reader/scanner, radio frequency identification (RFID) reader, audio recorder, etc.).

Computing system 222 may be a personal computer or workstation, having one or more processors 240 coupled to one or more user input devices 242 and data storage devices 244. The computer is also generally coupled to at least one output device such as a display device 246 and one or more optional additional output devices 248 (e.g., printer, plotter, speakers, tactile or olfactory output devices, etc.). The computer may be coupled to external computers, such as via an optional network connection 250, a wireless transceiver 252, or both.

The input devices 242 may include a keyboard and/or a pointing device such as a mouse. Other input devices are possible such as a microphone, joystick, pen, game pad, scanner, digital camera, video camera, and the like. The data storage devices 244 may include any type of computer-readable media that can store data accessible by the computer 222, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network such as a local area network (LAN), wide area network (WAN) or the Internet (not shown in FIG. 2).

In some cases, data storage system 210 contains a media management component 212, data files 214 stored in a database 213 or memory, and a job management component 216. The media management component may control the media used in data store operations, and also may control the exporting of media from the library or ordering/purchasing of media from an outside vendor. System 210 may use routines or other processes stored in data files when performing such controls or operations. Although not shown, the system may also control these functions, or part of these functions, within components 236 or 238 of computing system 222.

Figure 3:
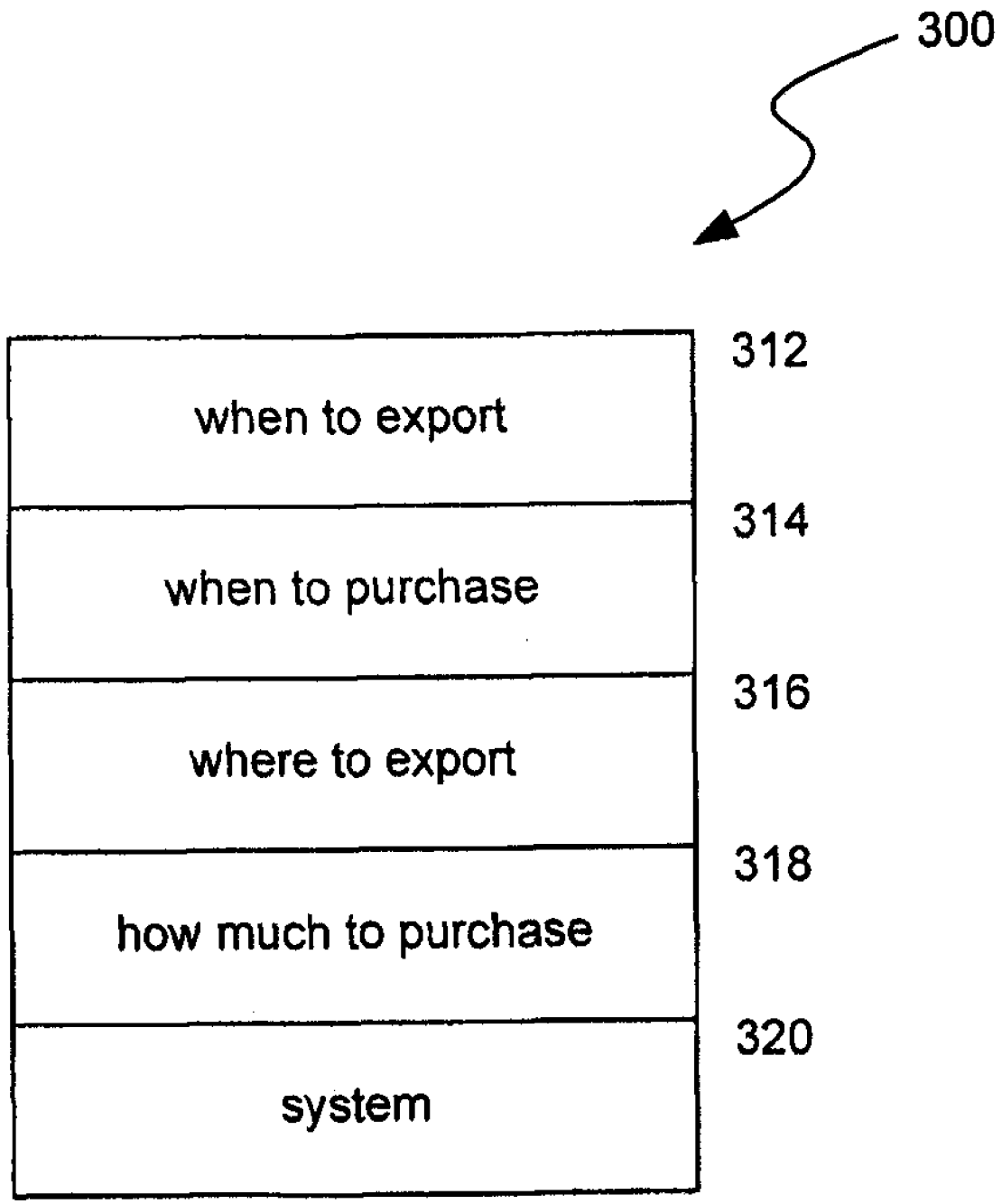
FIG. 3 illustrates an exemplary data structure that may comprise examples of the system.

Data files 214 may be any typical data files, such as database files, relational database tables, flat files, structured or unstructured data, and so on. FIG. 3 illustrates an exemplary data structure 300. Data structure 300 may store data in fields or records 312-318, such as system-wide data related to when media is to be exported 312, when media is to be purchased 314, where media is to be exported 316, how much media is to be purchased 318, when media is to be archived offsite, when media is to be discarded, and so on. Additionally, data structure 300 may also store other system information 320, such as information related to why certain media components are in the library, information related to the history of storage operational performance, and so on. For example, data structure 300, or other similar data files, may store applications related to the routines illustrated in the Figures herein.

In some cases, system information may indicate the reason for recalling a media component to the library. For example, the system may recall a media component in order to restore data to a failed component or resource of a file system or other system. The information 320 may indicate the restore operation, the schedule time for the restore operation, and so on, for one, some or all media components recalled to the library. In another example, the system information 320 may indicate or otherwise refer to storage operation performance, storage resources performance, individual component performance, and so on. The information may include historical or trend information, statistics, reports, or other groupings of data about the system and its operations. The system information 320 could of course be other information capable of providing knowledge to and about the system, such as information that enables the system to logically move media into and out of the system as needed or as predicted.

While not shown, this data structure, or a separate one, may include data specific to a type of media component, such as a particular tape. As with the media management component, some or all of the data files may be stored within in the data storage system 210, the computing system 222, or both. Job management component 216 manages storage operations and other processes.

Additionally, data storage system 210, computing system 222 or library 110 may include or carry USB or other removable memory components 275 configured to receive, transmit, write or read data from removable storage devices, such as USB flash drives, smart cards, and so on.

While the term "field" and "record" are used herein, any type of data structure can be employed. For example, relevant data can have preceding headers, or other overhead data preceding (or following) the relevant payload data. Alternatively, relevant data can avoid the use of any overhead data, such as headers, and simply be recognized by a certain byte or series of bytes within a serial data stream. Data structures may conform to conventions of object oriented programming and/or to other types of programming techniques. Any number of data structures and types can be employed herein.

Figure 4:
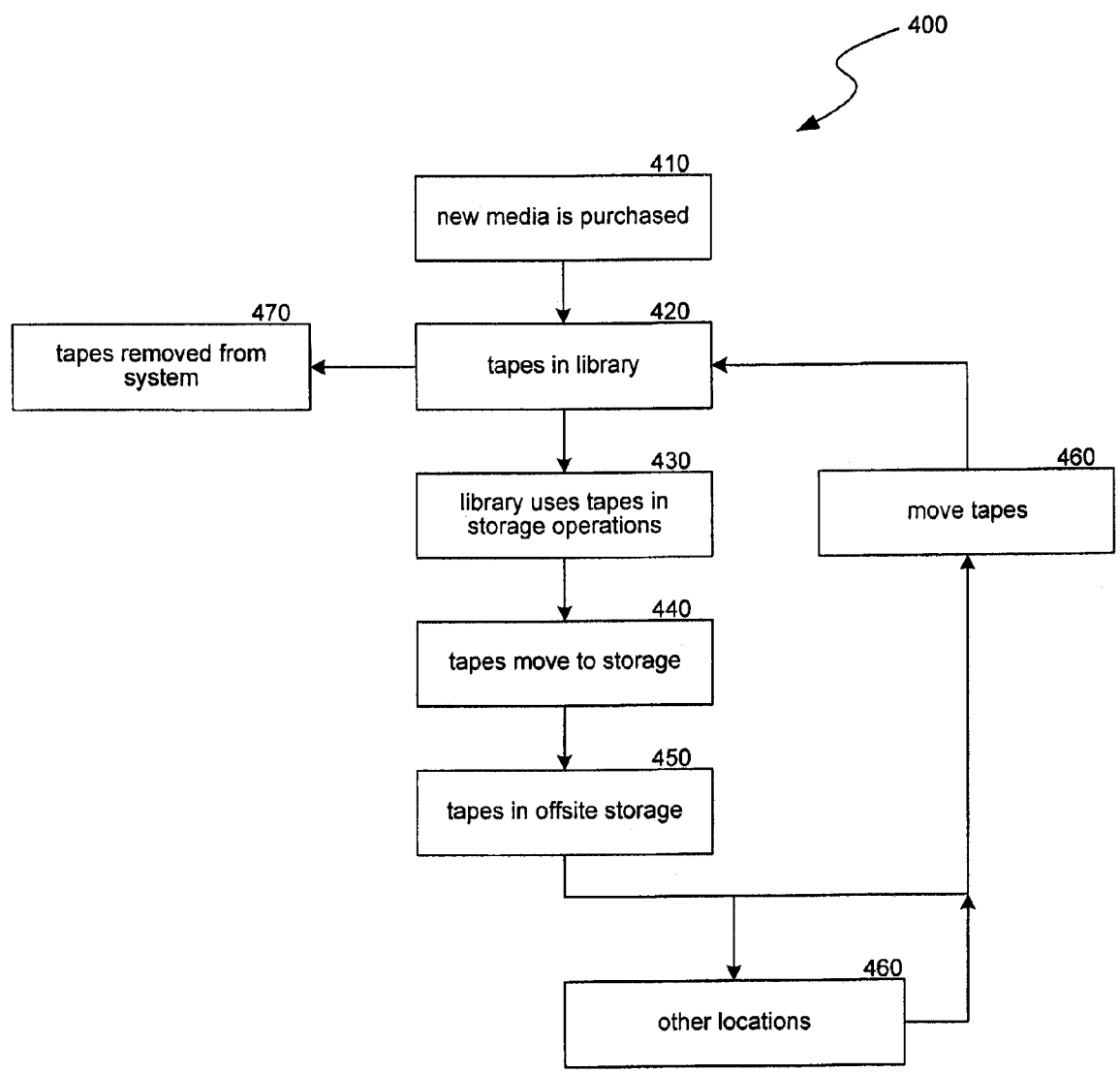
FIG. 4 is a flow diagram illustrating an example life cycle of a media component.

A flow diagram illustrating a life cycle of a media component is shown as routine 400 in FIG. 4. These flow diagrams do not show all functions or exchanges of data, but instead they provide an understanding of commands and data exchanged or processed under the system. Those skilled in the relevant art will recognize that some functions or exchange of commands and data may be repeated, varied, omitted, or supplemented, and other (less important) aspects not shown may be readily implemented.

At step 410, the system purchases or receives a new media component. The media component may be, for example, a magnetic tape used to store information during a storage operation. At step 420, the system transfers the newly purchased tape to a media library, such as media library 110. In the library or in transit to the library, the system may populate or update a data structure or other data object with information about the new tape, such as a tape identification. The system may use the created data structure to track the newly acquired tape as it travels through the life cycle of the tape. The system may track the magnetic tape or other media to and from the media library, updating a data structure as the media changes location. The system may dynamically move media as is described herein, and may update the data structure or create a new data structure to track such movement.

In step 430, the system performs backup or other storage operations and writes data onto the tape. In step 440, possibly after a certain predetermined delay, the system transfers the tape out of library 110 and to an offsite storage location. In step 450, the tape remains in offsite storage until needed by library 110 or other system components, such as for a restore operation or during standard rotation of data storage tapes. In these cases, in step 460, the tape is transferred back to library 110, another library, or rotated to another storage location, and the system employs the tape as needed for storage operations. Once the storage operations are completed, the system may transfer the tape back to the offsite storage location. At a predetermined lifecycle end for the tape, the system, in step 470, removes the tape from the system, such as moving the tape to a spare media pool or to another storage location, or may destroy and/or recycle the tape.

As discussed with respect to FIG. 4, a media component travels between many different locations during a component's life cycle. Implementing advanced management controls and functions, as discussed in greater detail below, allows a system or administrator to more effectively monitor and control media, further reducing errors, delays, or other problems that may exist in such data storage systems. In some cases, the effective management of lifecycles of media components enables data storage systems to complete storage and/or restore operations within prescribed timelines (e.g., data storage windows) and with fewer errors.

Recall Media Functions to Automate Archive Media Retrieval

As discussed above, the system may use information related to or associated with a media component before making decisions about exporting or recalling a media component.

Figure 5:
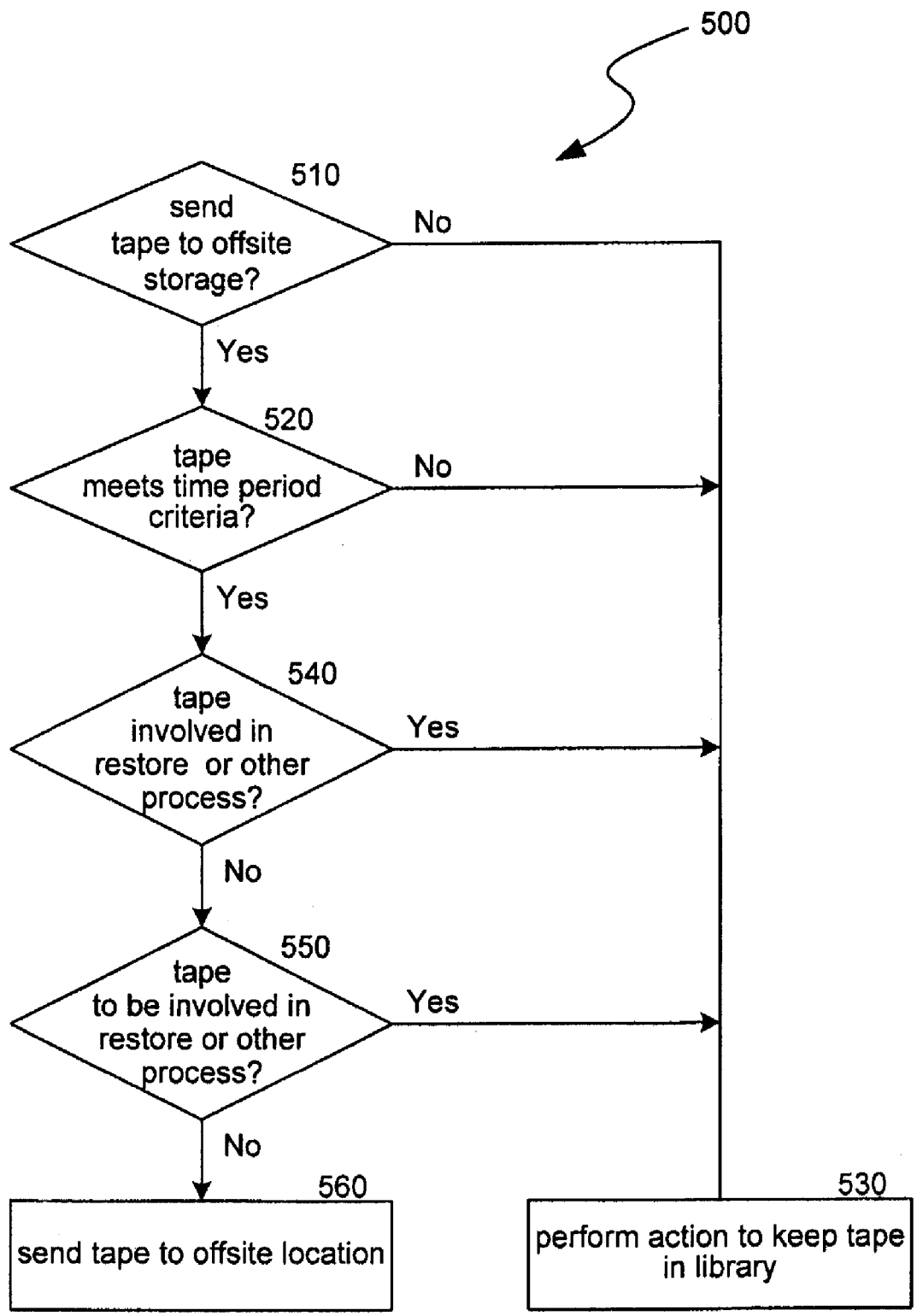
FIG. 5 is a process flow illustrating steps performed by the system before transferring media components out of a media library.

A process flow or routine 500 performed by the system 210 before transferring media components out of a media library is illustrated in FIG. 5. In step 510 of the routine 500, the system 210 (or user of the system, such as a system administrator) determines that a tape or other media component is eligible to be transferred out of library 110 to an alternate storage location, such as a location offsite. For example, the system may determine that the tape was involved in a data restore by looking to a data structure listing all recalled media and their reasons for being recalled. Alternatively, a system administrator may remove a hold flag from the tape, indicating the tape is no longer needed for system processes.

At step 520, the system compares the age of the tape with predetermined time rules or policies. For example, the system may have a global policy of exporting all tapes over x months old out of the library to an offsite location, or to an auxiliary media library or media pool. If the tape meets a time criteria, the routine moves to step 540, else the routine moves to step 530, and the tape remains in the media library. At step 540, the system looks to the use of the tape, and determines if the tape is involved in a restore or other process within the system. If the tape is not involved in any system processes, the routine moves to step 550, else the routine moves to step 530, and the tape is kept within the library. At step 560, the system reviews information regarding an intended use of the tape.

For example, the system 210 may have transferred or imported to the library 110 a tape received from the offsite location 130 into the library in order to perform a restore operation using data from the tape. Often, the tape may be older than other tapes in the library (i.e., would meet the time criteria discussed above under step 520), and absent other knowledge, the system (or a system administrator) may transfer the tape back out of the library before a restore operation occurs. However, as shown in step 550, the system may review information related to the intended use of the tape and decide to keep the tape within the media library based on the information. In some cases, the information may be about the system's purpose for the tape (such as a restore operation). Alternatively or additionally, the information may be about the data contained on the tape (e.g., a frequency of use or of import, an identity of the tape or the date contained on the tape, metadata associated with the data on the tape, and so on).

The system may recall tapes for restore operations, predicted restore operations, or other system operations. For example, the system may recall a tape for a predicted restore, and update a data structure containing a listing of tapes recalled to the media library to add an alert to the recalled tapes entry. The system may indicate a time in which the predicted restore is likely to occur, and maintain the alert for the tape until that time is reached, or until the tape is used in a predicted restore. Thus the system may look to various algorithms in determining when to hold onto recalled media and when to export recalled media.

Referring back to step 550, when the routine determines the tape is not involved in any processes, the routine to proceeds to step 560, and the system transfers the tape out of the library (such as to the offsite location). However, if the tape is involved in a process (or the system receives similar information), the system, at step 530, may perform an action to ensure the tape remains in the media library.

The system may send an alert to an administrator (such as to the administrator's email address), or create a log entry, listing media not to be exported out of the library. Other alerts are of course possible, such as text messages, prerecorded voice messages, facsimile messages, and so on, all of which are encompassed within "alerts" or "messages" noted herein. In some cases, the system generates a report (such as a daily or weekly report) listing media not to be exported. The system may flag the media itself, such as providing an alert or indication to a media component's housing. The system may predict the provisioning of media via an analysis of log entries and other alerts or flags.

The system may also send an alert or message when transferring a tape. In such cases, the alert may indicate the reason for the transfer, or may contain other information that describes the content of the tape, the reason of the tape's location, the reasons for the timing of the transfer, and so on. The system may send an alert before transferring or recalling a tape, during, or soon afterwards. For example, the system may send an alert when the system transfers a tape from the library to an offsite location, when the system recalls a tape from the offsite location to the library, when the system transfers a tape from one library to another, and so on.

Figure 6:
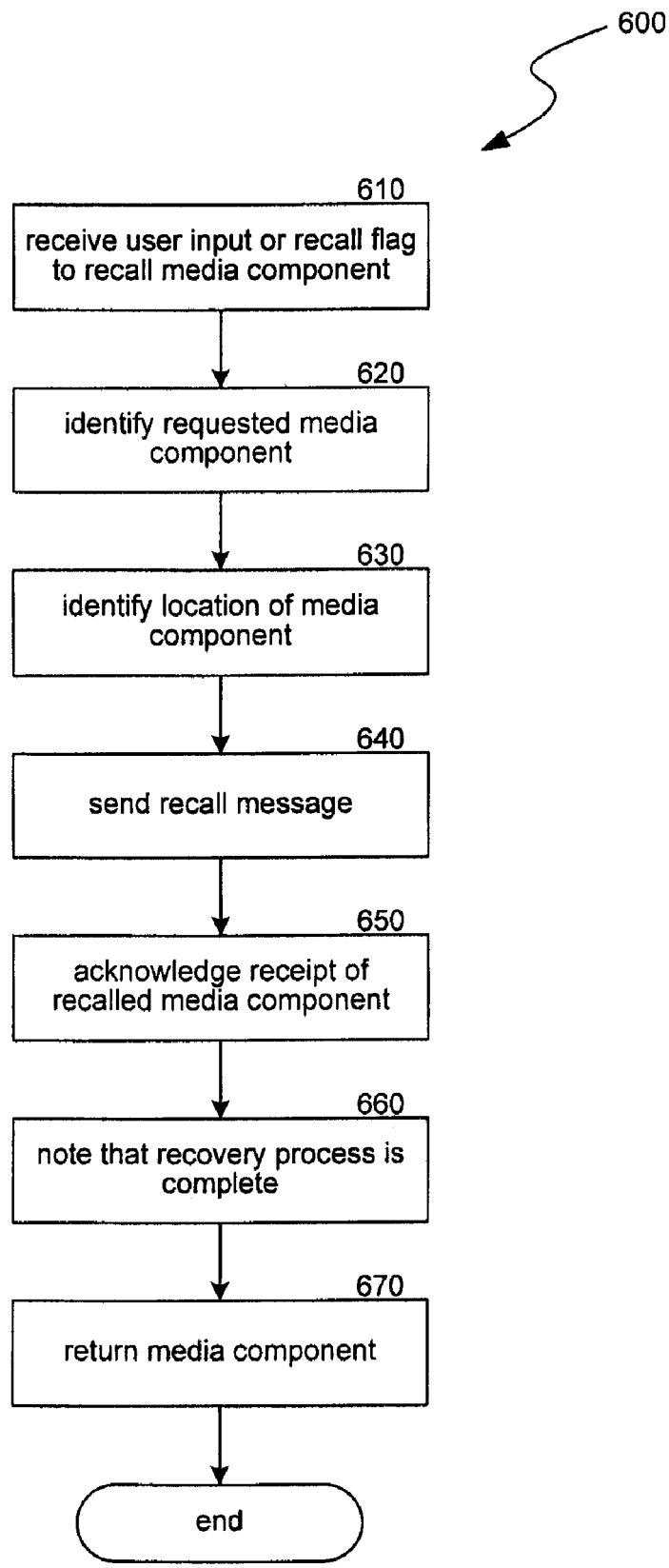
FIG. 6 is a process flow illustrating automatic recall and export of a media component.

Alternatively or additionally, the system may perform parts of life cycle 300 and routine 400 automatically. A process flow or routine 600 illustrating automatic recall and export of a media component is illustrated in FIG. 6. That is, the system 210 may perform some or all of the steps without the need for an administrator, or after a single input or action by the administrator.

For example, in step 610, the system receives a user input or other such information (e.g., automatically generated recall flag or other command initiator) indicating a need to recall a media component from an offsite storage location. In step 620, the system may automatically identify the media component to be recalled (such as determine the media component's ID or serial number). The system, in step 630, may then automatically identify the location of the media component, such as from the appropriate data structure field stored in database 213. If the identified media component is at an offsite location, the system, in step 640, may automatically send an email or other message to the appropriate offsite storage location containing the media component. Once a media component is recalled, the system 210, in step 650, may automatically acknowledge receipt of or import in of the media component within the library 110 (as explained herein), and may scan, identify, and/or verify the recalled media component. In step 660, the system may automatically note a recovery process using the media component has occurred or is complete (such as by updating a log of recalled media), and, once the recovery process has occurred, in step 670, automatically send the media component back to the offsite storage location or back into the aging cycle.

Alternatively or additionally, the system may automatically generate reports or other information to send with media components. For example, in step 670, the system may prepare a media component for shipment back to an offsite media component storage facility. The system may automatically generate a report listing the tape, such as a report in a format desired by the storage facility and containing information desired by the storage facility. Also, the system may automatically generate a shipping label or other materials used in shipping the tape. The system may also automatically generate an alert or other indicator or otherwise communicate with the storage facility indicating an incoming exporting of the tape. The system may also automatically alert a carrier to pick up the tape. In other words, the system may automatically generate and facilitate the preparation, shipping, and management of media components to be exported.

Figure 7:
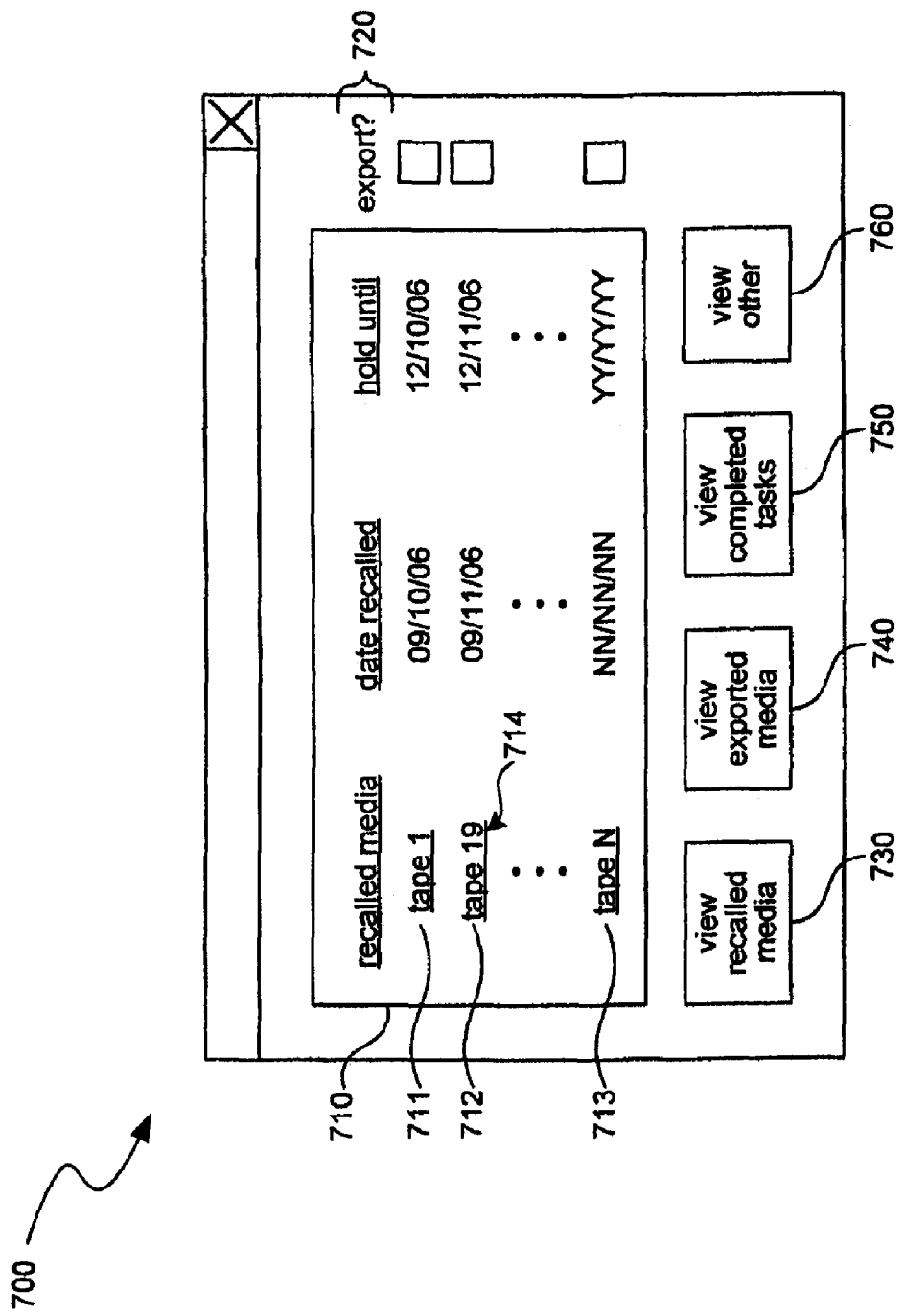
FIG. 7 is a representative computer display or web page illustrating recall media functions.

Referring to FIG. 7, a representative computer display or web page will now be described with respect to recall media functions, such as for use with automated media retrieval. The screen of FIG. 7, and screens discussed below, may be implemented in C++ or as web pages under XML (Extensible Markup Language), HTML (HyperText Markup Language) or any other scripts or languages or methods of creating displayable data, such as the Wireless Access Protocol ("WAP"). The screens or web pages provide facilities to receive input data, such as a form with fields to be filled in, pull-down menus or entries allowing one or more of several options to be selected, buttons, sliders, hypertext links or other known user interface tools for receiving user input. While certain ways of displaying information to users is shown and described with respect to certain Figures, those skilled in the relevant art will recognize that various other alternatives may be employed. The terms "screen," "web page" and "page" are generally used interchangeably herein, and may display output or output into another location (e.g., into a file). When implemented as web pages, the screens are stored as display descriptions, graphical user interfaces, or other methods of depicting information on a computer screen (e.g., commands, links, fonts, colors, layout, sizes and relative positions, and the like), where the layout and information or content to be displayed on the page is stored in a database. In general, a "link" or path refers to any resource locator identifying a resource in a network, such as a display description provided by an organization having a site or node on the network. A "display description," as generally used herein, refers to any method of automatically displaying information on a computer screen in any of the above-noted formats, as well as other formats, such as email or character/code-based formats, algorithm-based formats (e.g., vector generated), or matrix or bit-mapped formats. While aspects of the system are described herein using a networked environment, some or all features may be implemented within a single-computer environment.

Referring to FIG. 7, a screen 700 or graphical user interface (such as a GUI 220 for a system administrator), may contain a display of recalled media 710. Display 710 may show recalled media currently residing in the media library, such as tapes denoted, for example, "tape 1" 711, "tape 19" 712, "tape N" 713, and so on. Display 710 may contain active elements, such as a path 714 that enables a user to access details about the media 711-713. For example, a user clicking on "tape 19" may cause the system to display metadata about the tape, content stored in the tape, remarks or information regarding the reason for the tape's location in the library, and so on (not shown).

Additionally, screen 700 may also display an export element 720 that enables an administrator to override the system and/or select a media component to export. For example, the administrator may use a recalled media component for a restore operation ahead of a scheduled restore operation. Instead of waiting for the data the media is scheduled to assist in a restore, the administrator may select the media via component 720 and add the media to the following export batch.

Screens may also display active components related to media in the library. For example, a user may select component 730 to view some or all recalled media stored in the library, may select component 740 to view some or all exported media from the library (such as media exported in a given week or cycle), may select component 750 to view completed tasks with recalled or stored media, or may view other media or systems processes or resources.

Automated Media Prediction, Ordering and Reporting

As discussed above, a system capable of understanding and/or predicting future data storage needs may be able to achieve greater levels of data storage accuracy, may complete storage operations more quickly, and/or may provide more efficient backup or restore or other storage operations.

Figure 8:
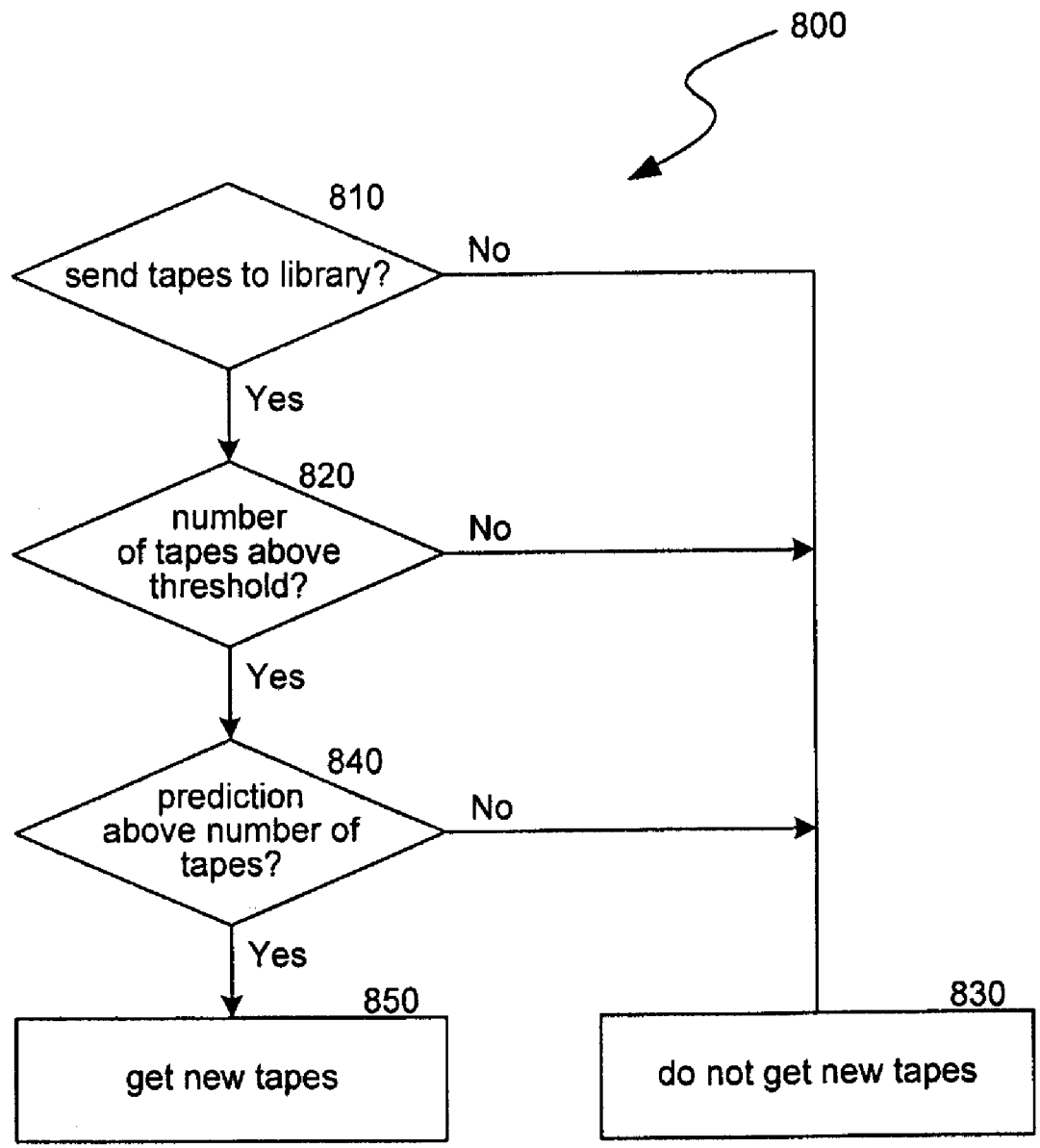
FIG. 8 is a process flow illustrating steps performed by the system in purchasing new media components.

Referring to FIG. 8, a process flow illustrating a routine 800 performed by the system in purchasing new media components is described.

In step 810, the system begins the routine 800 to determine a need to order and/or purchase media components (such as tapes) for a media library, such as media library 110. In step 820, the routine may look to the number of new or unused tapes already contained in the library, and if the number is above a predetermined threshold, proceed to step 840, else proceed to step 830. Alternatively or additionally, the system may skip step 820. In these cases, the system may have a policy that instructs the system to order a predetermined number of tapes, regardless of how many tapes are already contained in the library 110.

At step 830, the routine ends and new tapes are not purchased. At step 840, the system may look to characteristics of a data storage system employing media library 110, and determine that the number of tapes in the library 110 is below a number expected to be needed for future system operations. In some cases, the system may look to the overall capacity of available media in the library, and make decisions based on the capacity. The system may track data storage to make similar predictions. The system may track tape usage over a certain period of time and determine usage patterns, such as an overall usage increase. The system may then use such patterns to modify the ordering process for future storage operations. For example, the system tracks data stores over a month and determines that the data storage system is transferring 10 percent more data than in the previous month. The system many modify the number of tapes normally purchased or brought into the system to account for the data transfer increase. The system may then track transfers of data for the following month and continue to update and modify ordering rules and policies.

For example, the system 210 may determine that there are ten unused tapes to be used in a data storage operation to occur on the first Friday after the end of a company's fiscal year. For example, the system may check a log of historical data store information. Although the system generally uses eight tapes for Friday data stores, the system may refer to the logged history of storage operations and determine that data stores occurring soon after the end of the fiscal year generally use fifty percent more tapes than normal data stores. Using this information, the system automatically determines that twelve tapes will be needed for the upcoming Friday data stores, and orders two extra tapes. The system may then update the log or add additional information to a historical database indicating the order of tapes. Therefore, using context information from the data storage system, the system may be able to avoid an unnecessary delay in storage operations due to a shortage of physical media.

The system may make decisions based on capacity as well. Using the example above, system 210 may determine that the available media for a storage operation contains 11 GB of free space. The system may review trend data, historical data or information and deduce that the next storage operation will require 15 GB of data. Therefore, the system may order additionally media to raise the overall capacity of available copy space an additional 4 GB to the predicted need of 15 GB. The system may order any number of media components to satisfy the predicted capacity.

Referring back to routine 800, at step 840, if the routine determines that enough tapes are in the library to satisfy a predicted need for tapes, the routine proceeds to step 830, and ends. If there are fewer tapes than predicted, the routine proceeds to step 850, and performs an action to purchase additional tapes.

The system 210 may perform actions in addition to these noted above. For example, the system, may alert an administrator to purchase additional tapes (such as by sending an automatic, scripted email to the administrator's email address). Alternatively, the system may automatically order and/or purchase additional tapes, and may alert the administrator of any orders or purchases. The system may also automatically store any incoming (ordered or purchased) media components identifications, such as media component IDs, serial numbers, corresponding bar codes, and so on. For example, the system may populate or update a data structure that tracks the contents of a media library, the components used in daily operations of the media library, and so on.

Additionally, the system 210 may update the history of storage operations after performing actions. The system may redefine rules or policies after one order, a number of orders, a predetermined pattern of orders, and so on. The system may alert an administrator when rules or policies are updated. Additionally or alternatively, the system may generate proposed rules or policies based on predicted ordering or purchasing behaviors. The system may then send an alert, report, or other notification to be approved by an administrator. In these cases, the system may be constantly monitoring and updating its policies with respect to the flow of new media components into the library.

Figure 9:
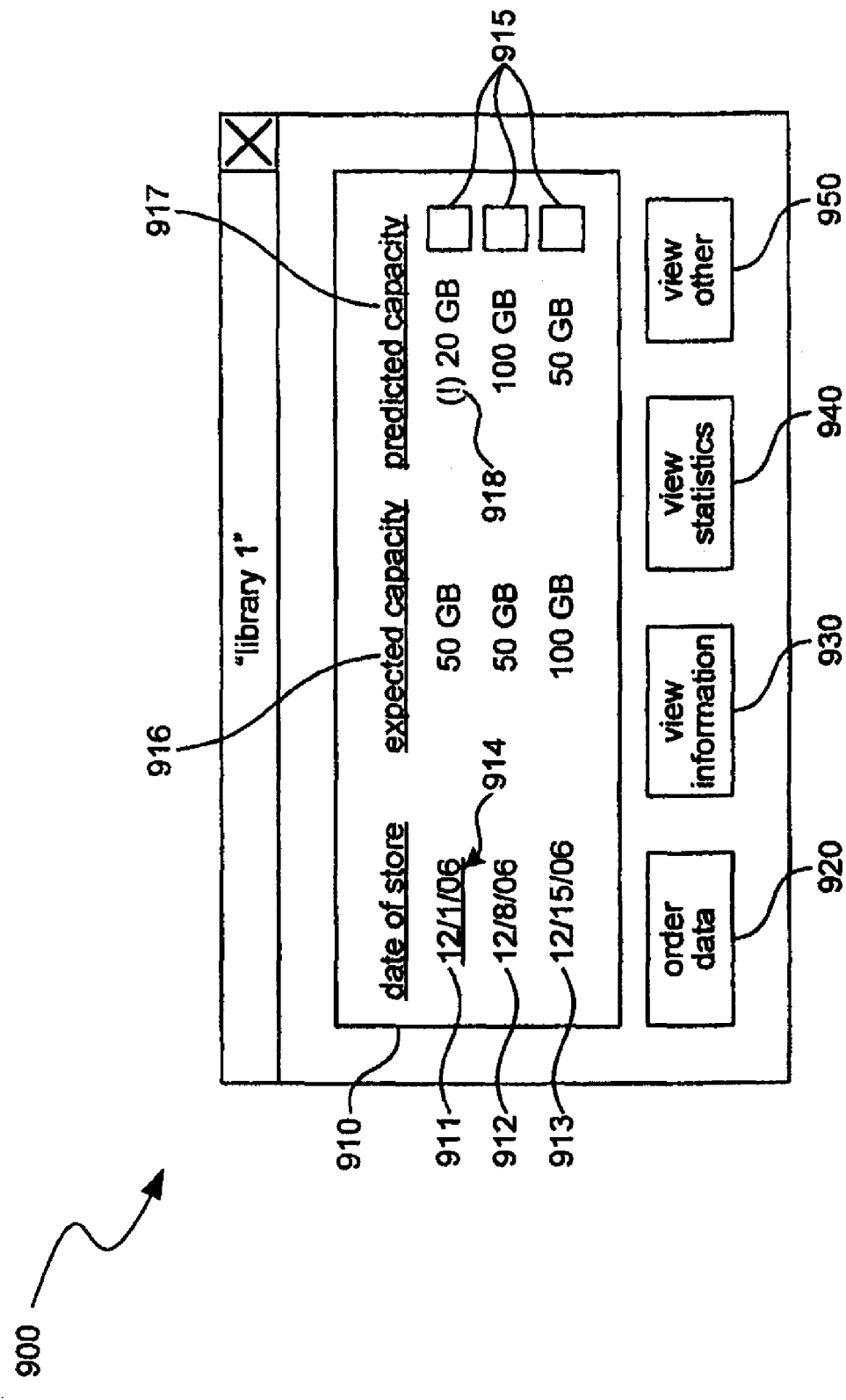
FIG. 9 is a representative computer display or web page illustrating automated media prediction.

Referring to FIGS. 9, a representative computer display or web page will now be described with respect to automated media prediction, such as for use with automated media ordering. Screen 900 may display a data storage operation screen 910 that shows some or all past, present, or future storage operations for a given media library or libraries. For example, "Library 1" may have three scheduled storage operations displayed 911-913. The display may indicate the expected available capacity 916 of the library for a storage operation and a predicted capacity need 917 for the storage operation. In this example, the system indicates that for a storage operation on Dec. 8, 2006, labeled as component 912, the library will have 50 GB of available media space for a data store predicted to require 100 GB. Therefore, the system may automatically order additional media to fulfill the deficiency, or may alert the user via an alert 918 or other indicator to order more media. The system may receive an order via component 915, component 920, or in other ways (such as via channels other than interface 900).

Additionally, the system may display information for a data storage operation. For example, by accessing a path 914, the system may display information related to the storage operation of Dec. 1, 2006, such as information about the scheduled data store, information about the predicted or expected capacity (reasons why, the number of tapes or media), and so on. The system may also display and provide information related to other information about the library via component 930, statistical information related to the prediction of storage needs and capacities via component 940, and other information via component 950. Of course, the system may display via screen 900 or other screens other information or data to users and administrators of the system.

The system 210 may look to a number of sources in predicting the number of media components likely to be needed in storage operations. For example, the system may look to context information such as calendar or historical information, user information (such as company history information), and so on. The system may look to recent storage operational information (such as information related to trends in recent media component needs), may look to error information (such as information describing failed or erroneous storage operations), may look to global trend information about storage operations performed at a number of different and separate data storage systems, and so on.

Retrieved Media Verification and Confirmation Systems

Referring back to FIG. 2, computing system 222 (or, alternatively, data storage system 210) may also contain a verification system 260 that checks and verifies media components as they enter (or exit) the media library 110. For example, the verification system 260 may contain a hand held bar code reader 262 or other type of data capture device that identifies entering media components (such as by scanning a bar code on the media component). The verification system 260 may then look to a report or other file (such as an emailed list of requested media components) that lists requested media components and verify that the media component is on the report. If the media component is not on the report, the verification system may perform an action to determine the proper location for the media component. For example, the system may check a data structure containing media component identifications and locations, may alert a system administrator, may flag the media component, and so on. The verification system may automatically verify entering media components, or a media library administrator may perform the verification, such as with scanner or reader 262.

Figure 10:
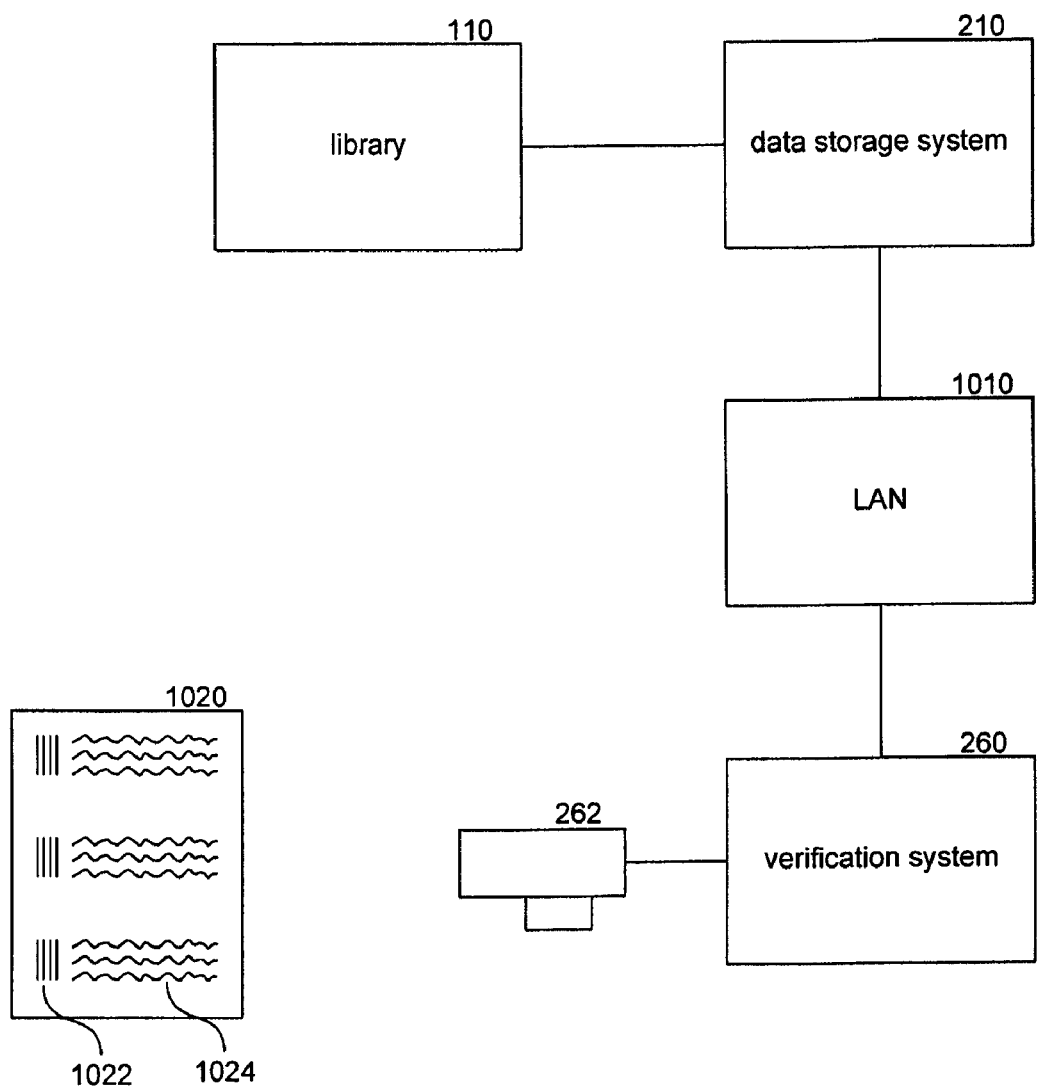
FIG. 10 is a block diagram illustrating components of a system for verifying recalled or exported media components.

A block diagram illustrating components of a system for verifying recalled or exported media components is shown in FIG. 10. The system may be wirelessly connected to or otherwise in communication with library 110 and the data storage system 210 via a LAN 1010 or other network, although a wired connection may be employed. The verification system 260 may include a scanner 262, such as a bar code scanner in this example, an RFID scanner, or other detection components. The bar code scanner may be used with a media component report, such as report 1020 illustrated in FIG. 10. The report 1020 may contain machine readable information 1022 (such as bar codes, media IDs, or other machine readable indicia or devices (like RFID tags)) and human readable information 1024 (such as descriptions of media components). An administrator or the system may use the scanner 262 to obtain information from the report 1020 via the bar codes 1022. Further details with respect to verifying media components are discussed with respect to FIG. 11.

Figure 11:
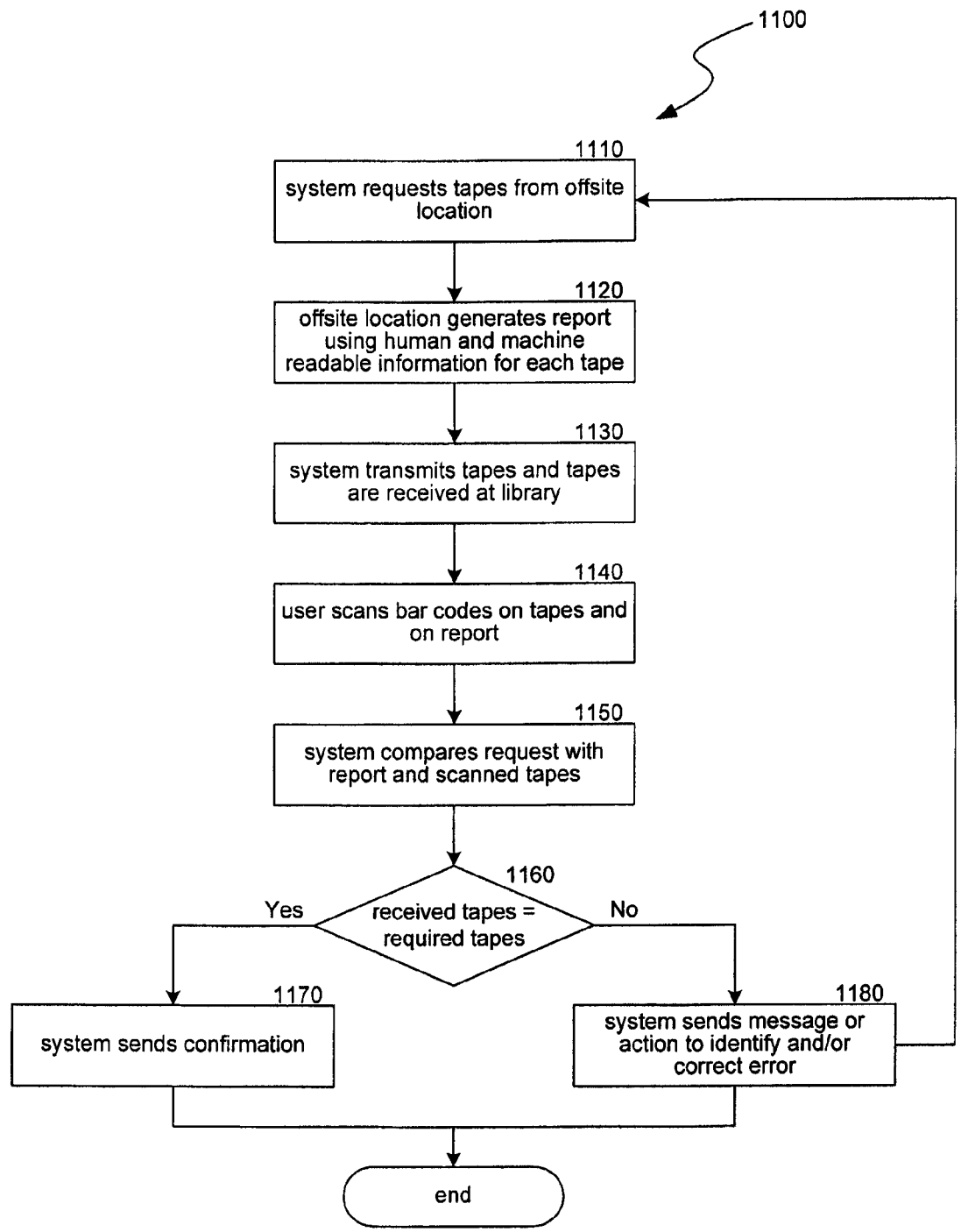
FIG. 11 is a flow diagram illustrating a routine for verifying recalled media components.

A flow diagram illustrating a routine 1100 for verifying recalled media components is shown in FIG. 11. In step 1110, the system may request media components (such as tapes) from an offsite storage location (such as a media storage facility). Before sending tapes to the system, in step 1120, the offsite location may generate a report 1020 or other communication or indication containing machine readable information 1022 and human readable information 1024 for the tapes. Alternatively or additionally, the report may only contain the human readable information 1024, and the system may generate a machine readable report or communication using the information 1024. Also, the system may generate a report when requesting media components. The system, in step 1130, receives the requested tapes and corresponding report 1020. In step 1140, the system, via an administrator or automatically via sighted library means, scans barcodes on the tapes and barcodes 1022 on the report 1020 (or on a system generated report). Alternatively or additionally, the system may import the tapes to the library and a component of the library may scan the tapes.

In step 1150, the system compares the scanned bar codes from the requested tapes with the scanned bar codes of a corresponding report. In step 1160, the system determines if the received tapes are the same as the tapes contained in the report. If the tapes are the same, the routine 1100 proceeds to step 1170, else to step 1180. In step 1170, the system may send a confirmation message or other alert, and end. In step 1180, if the system determines that the comparison of requested tapes to recalled tapes (or, of the received tapes to the tapes listed on a corresponding report), the system may send a message or perform an action identifying the error and/or requesting a correction.

The system, in step 1180, may automatically request an offsite location to correct a tape request. The system may send information related to the comparison in step 1160. For example, if the system receives ten tapes from an offsite storage location, and eleven tapes are listed on an accompanying report, the system may automatically transmit a request for the missing tape. The request may include information (such as data files or other content stored on the tape, bin information, date of exportation, and so on related to the verified ten tapes and the one missing tape. The system may also transit a message requesting a refund for an erroneous shipment, or may request a future credit. Additionally, should a received tape not be a tape requested by the system, the system may automatically generate shipping materials and may automatically alert a carrier to ship the tape back to the offsite storage location.

In some cases, the system may verify the accuracy of a shipment of newly purchased tapes. The system may compare received tapes with an invoice, report, accounting system interface or API, or other accompanying documentation or related display of information, and determine the accuracy of the shipment, as described in step 1160. If there is a discrepancy, the system may alert a vendor of the tapes to send any missing tapes, to request a refund, to request additional tapes, and so on. The system may gather data from a common courier to track locations of tapes in transit and provide a graphical user interface to depict currently reported locations of tapes in transit.

Figure 12:
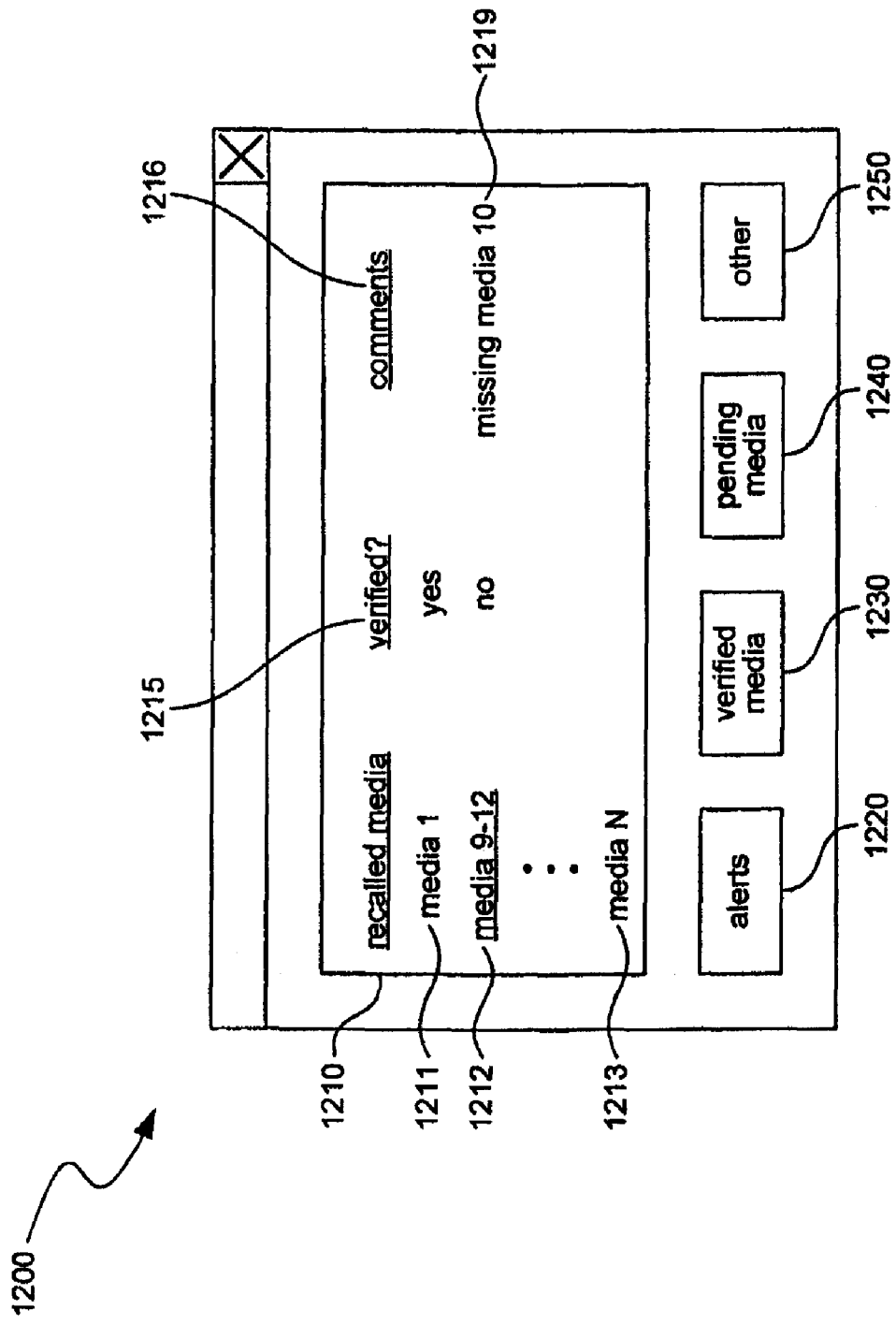
FIG. 12 is a representative computer display or web page illustrating screens used in retrieved media verification.

Referring to FIG. 12, a representative computer display or web page will now be described with respect to retrieved media verification, such as for use with confirmation systems. Screen 1200 may show a display 1210 of recalled media, such as "media 1" 1211, a group of "media 9-12" 1212, "media N," and so on. The display 1210 may show an indicator 1215 that the media has been verified by the system, and may show comments or other information 1216 about the media or verification of the media. For example, display 1210 may indicate via a "No" indicator 1218 that "media 9-12" is not verified, and may include information 1219 as to the reason for the "No" indication (in this example, the system did not verify that media 10 is in the library).

Screen 1200 may also display components or display to view alerts 1220, components or displays to view verified media 1230, media pending verification or future actions to verify the media 1230, or other information 1240.

In some cases, the system described above may be used with respect to recalling and exporting data, in place of media components that store data. For example, in a recall operation, an offsite storage location may operate by reading data from one of the stored tapes and only transfer the read data (such as electronically transfer) to the library 110 or directly to the data storage system 210. In these cases, the system may recall large amounts of electronic data, and store such data in a large buffer or other readily accessible storage. However, storing large amounts of recalled data may compromise the local disk space of a data storage system and the system may experience similar problems as those discussed above. Therefore, the system may use the methods described above to similarly make decisions with respect to the export and recall of data as well as media components that store data.

Pre-Recall of Media Components

In some cases, the system may use some or all of the processes discussed herein to predict media to be used in restore and other operations. That is, the system may anticipate a restore operation based on a review of historical data or information, may recall media containing data required for the restore operation, and may determine a time period or schedule to maintain recalled media in the media library. Additionally, the system may export media based on use of the media (that is, media used more often in restore operations may be less likely to be exported). Thus, the system may constantly monitor the provisioning of resources in the data storage system to determine advantageous locations for media components. The system may save users valuable time and effort in data restores by predicting and/or anticipating a restore operation or by maintaining often used media components within close proximity or inside a media library capable of performing restore operations.

Figure 13:
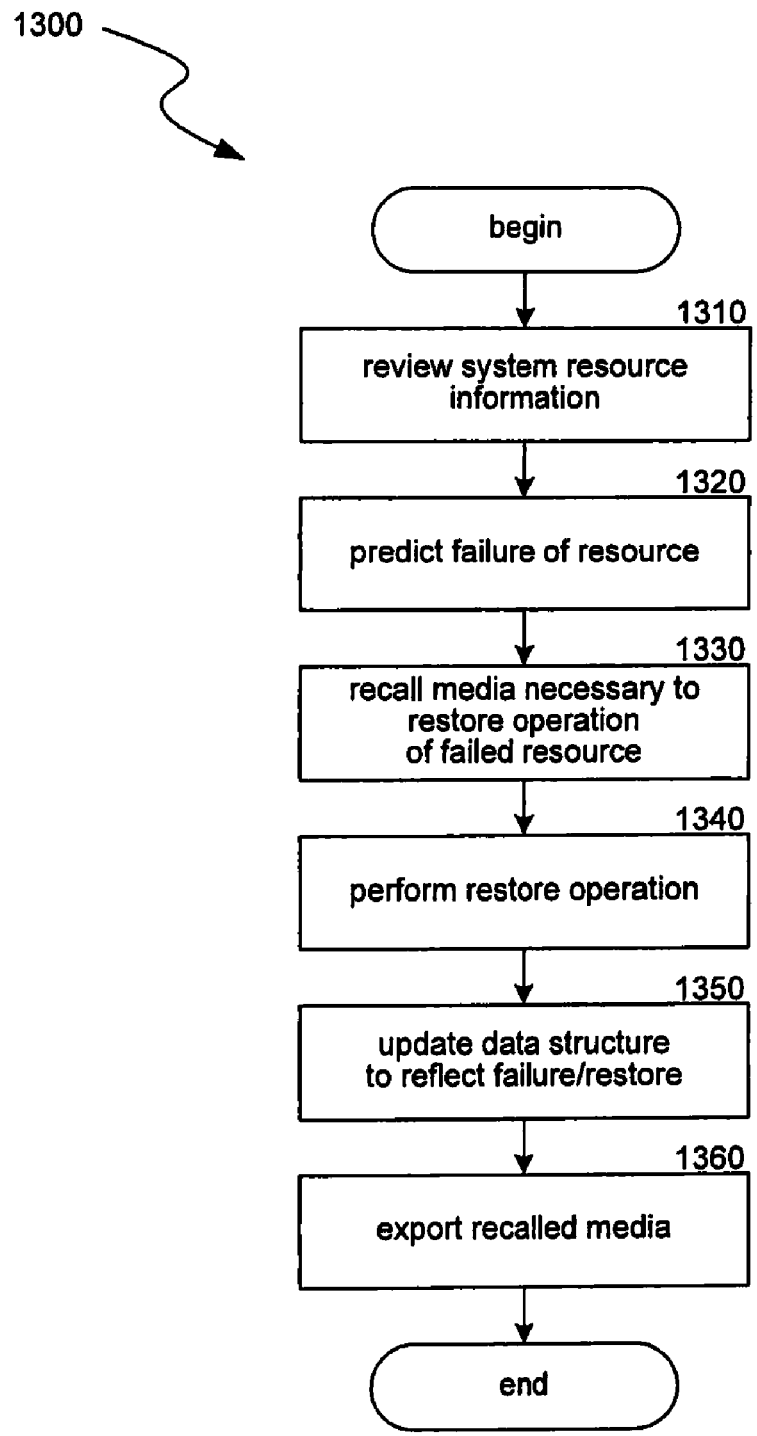
FIG. 13 is a flow diagram illustrating an exemplary routine for recalling media based on a predicted restore operation

Referring to FIG. 13, a flow diagram illustrating a routine 1300 for recalling media based on a predicted restore operation is shown. In step 1310, the system reviews the data storage system information. The system may review historical failure information related to components or other resources of the system. In step 1320, the system may, upon reviewing such information, predict the failure of a system resource. In step 1330, the system may recall media containing information and other resources necessary to restore operation of a failed system resource. In step 1340, the system predicts correctly, and performs a restore operation on the failed resource using the recalled media component. In step 1350, the system may update a log, database, or other data structure to reflect the failure and restore in order to provide the system with additional information for later predictions. In step 1360, the system may export the media back to the previous location of the media, such as an offsite storage location or media pool.

For example, the system determines that a "component B" fails three to five days after a "component A" fails. Once alerted to the failure of component A, the system may predict the failure of component B in three to five days. Therefore, the system may recall a media component containing the information needed to restore the information in component B. If component B fails, the system may utilize the recalled media to restore the component, update a log related to system restore processes, and export the media out of the library. If component B does not fail, the system may store the media in the library until a pre-determined time, and then export the media. Thus, the system may anticipate the failure of a component and quickly act to restore the component, trading off a perhaps unnecessary recall of media.

Movement Based on Changes to a Data Set

In some cases, the system may recall or export media to a media library based on changes to a data set with a file system or other data system associate with a data storage system. For example, the system may review or receive an indication of changes made to a data set, such as an original data set of a file system that is often copied, and recall media components containing similar data.

Figure 14:
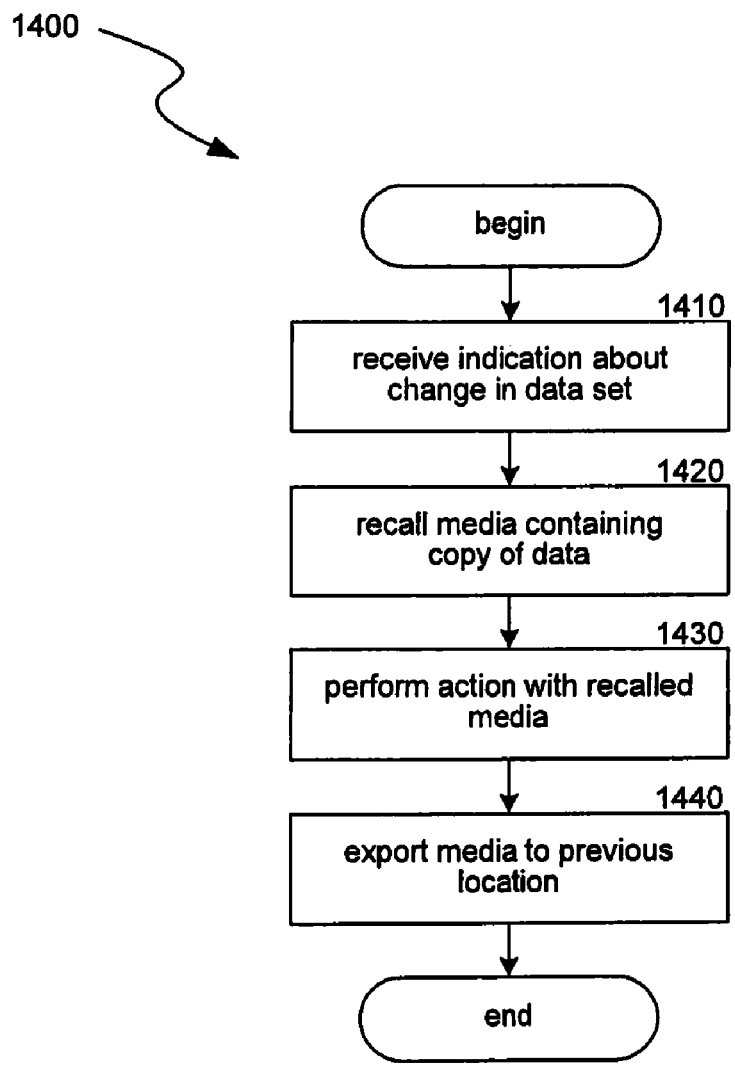
FIG. 14 is a flow diagram illustrating an exemplary routine for recalling media based on changes to a data set.

Referring to FIG. 14, a flow diagram illustrating an exemplary routine 1400 for recalling media based on changes to a data set is shown. In step 1410, the system receives an indication about a change to a data set. For example, the system may identify a change in data or a characteristic or metadata of data associated with a data set. A change to a characteristic may be, for example, a change to a use of the data, an owner of the data, a frequency of access to the data, the size of the data set, and so on. In step 1420, the system recalls media components containing a copy of the data or similar data. For example, the system may recall a tape having a copy of the data set identified in step 1410. The system, in step 1430, may perform an action with the recalled media based on the changes or based on other information. For example, the system may update the metadata related to the copy of data on the recalled media component to reflect the identified changes. The system may recall the media to perform other actions, such as additional data stores, restores, and so on. The system may recall the media and store the media in the library for a pre-determined time, or may look to an algorithm or data structure to determine how best to locate the media component. For example, the system may identify a change as an indicator of a future restore operation, and recall a media component that may assist in the future restore operation. In step 1440, the system, upon using a recalled media component, may export the media out of the library to a previous location or other location of the recalled media component.

Conclusion

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. In other words, the software and other modules described herein may be executed by a general-purpose computer, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multiprocessor systems, microprocessor-based or programmable consumer electronics, set-top boxes, network PCs, minicomputers, mainframe computers, and the like. Indeed, the terms "computer," "server," "host," "host system," and the like are generally used interchangeably herein, and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, via a network, via a browser or other application in an ASP context, or via other means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Examples of the technology may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of examples of the technology is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the technology provided herein can be applied to other systems, not necessarily the system described above. The elements and acts of the various embodiments described above can be combined to provide further examples. Any patents and applications and other references noted above, including any that may be listed in accompanying filing papers, are incorporated herein by reference. Aspects of the invention can be modified, if necessary, to employ the systems, functions, and concepts of the various references described above to provide yet further examples of the technology.

These and other changes can be made to the invention in light of the above Detailed Description. While the above description describes certain embodiments of the invention, and describes the best mode contemplated, no matter how detailed the above appears in text, the invention can be practiced in many ways. Details of the system and method for classifying and transferring information may vary considerably in its implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the technology under the claims. While certain aspects of the technology are presented below in certain claim forms, the inventors contemplate the various aspects of the technology in any number of claim forms. For example, while only one aspect of the technology is recited as embodied in a computer-readable medium, other aspects may likewise be embodied in a computer-readable medium. Accordingly, the inventors reserve the right to add additional claims after filing the application to pursue such additional claim forms for other aspects of the technology.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of verifying a request for recalling data storage media from an offsite location to a data storage media library associated with a data storage operation, the method comprising:
   receiving a report comprising a list of media components requested in a shipment of media components sent from an offsite media storage facility to the media library, each item in the list comprising both machine-readable and human-readable information that describes a particular requested media component;
   electronically scanning the machine-readable information from the list in the report to identify automatically or partially automatically the requested contents of the shipment of media components;
   upon receipt at the media library of the shipment of media components from the media storage facility, electronically scanning each media component in the shipment in order to automatically or partially automatically identify actual contents of the shipment of media components;
   automatically comparing the identified requested contents of the shipment with the identified actual contents of the shipment that was sent from the media storage facility; and
   when the comparison determines that the identified actual contents of the shipment are the same as the identified requested contents of the shipment, automatically sending an electronic confirmation of receipt of the shipment;
   when the comparison determines that the identified actual contents of the shipment do not include all of the identified requested contents of the shipment, automatically or partially automatically performing an action to obtain requested media components that were not included in the shipment; and,
   when the comparison determines that the identified actual contents of the shipment include extra media components that were not in the identified requested contents of the shipment, automatically or partially automatically performing an action to return the extra media components to the offsite media storage facility.

2. A system for verifying a shipment of data storage media components received at a media library from an offsite media storage facility, the system comprising:
   an identification component, configured to:
      electronically scan machine-readable information from a report to identify automatically or partially automatically requested contents of the shipment of media components, wherein the report comprises a list of media components requested in the shipment of media components sent from the offsite media storage facility to the media library, each item in the list comprising machine-readable and human-readable information that describes a particular requested media component;
      upon receipt at the media library of the shipment of media components from the media storage facility, electronically scan each media component in the shipment in order to automatically or partially automatically identify actual contents of the shipment of media components;
   a comparison component configured to compare the identified requested contents of the shipment with the identified actual contents of the shipment that was sent from the media storage facility; and
   a verification component in communication with the identification component and comparison component that is configured to perform at least two of:
      1) when the comparison determines that the identified actual contents of the shipment are the same as the identified requested contents of the shipment, automatically send an electronic confirmation of receipt of the requested contents of the shipment;
      2) when the comparison determines that the identified actual contents of the shipment do not include all of the identified requested contents of the shipment, automatically or partially automatically perform an action to obtain requested media components that were not included in the shipment; and,
      3) when the comparison determines that the identified actual contents of the shipment include extra media components that were not a portion of the identified requested contents of the shipment, automatically or partially automatically perform an action to return the extra media components to a location associated with the offsite media storage facility.

3. The system of claim 2, wherein the identification component includes a bar code reader configured to electronically scan the media components by reading one or more bar code symbols of the media component.

4. The system of claim 2, wherein the report is automatically generated by a provider of the shipment of media components.

5. The system of claim 2, further comprising:
a system information component, wherein the system information component is configured to review information obtained from the report and determine a possible location of a requested media component that was not included in the shipment.

6. The system of claim 2, further comprising:
an error correction component, wherein the error correction component performs an action to request a refund or credit for an erroneous shipment when the verification component determines that the shipment does not contain all the requested media components.

7. The system of claim 2, wherein the verification component is further configured to, when the comparison determines that the identified actual contents of the shipment include extra media components that were not a portion of the identified requested contents of the shipment, automatically generate shipping materials and automatically alert a carrier to ship the extra media components to a location associated with the offsite media storage facility.

8. The system of claim 2, further comprising:
a tracking module configured to gather data from a common courier to track locations of media components in transit to the media library and provide a graphical user interface to depict currently reported locations of media components in transit.

9. The method of claim 1, wherein a bar code reader is used to electronically scan the media components by reading one or more bar code symbols of the media component.

10. The method of claim 1, wherein the report is automatically generated by a provider of the shipment of media components.

11. The method of claim 1, further comprising:
reviewing information obtained from the report to determine a possible location of a requested media component that was not included in the shipment.

12. The method of claim 1, further comprising:
performing an action to request a refund or credit for an erroneous shipment when the verification component determines that the shipment does not contain all requested media components.

13. The method of claim 1, further comprising, when the comparison determines that the identified actual contents of the shipment include extra media components that were not a portion of the identified requested contents of the shipment,
automatically generating shipping materials, and
automatically alerting a carrier to ship the extra media components to a location associated with the offsite media storage facility.

14. The method of claim 1, further comprising:
gathering data from a common courier to track locations of media components in transit to the media library, and
providing a graphical user interface to depict currently reported locations of media components in transit.

15. A tangible computer-readable medium having computer-executable instructions that, when executed by a computer, perform a method for verifying a request for recalling data storage media from an offsite location to a data storage media library associated with a data storage operation, the method comprising:
receiving a report comprising a list of media components requested in a shipment of media components sent from an offsite media storage facility to the media library, each item in the list comprising both machine-readable and human-readable information that describes a particular requested media component;
electronically scanning the machine-readable information from the list in the report to identify automatically or partially automatically the requested contents of the shipment of media components;
upon receipt at the media library of the shipment of media components from the media storage facility, electronically scanning each media component in the shipment in order to automatically or partially automatically identify actual contents of the shipment of media components;
automatically comparing the identified requested contents of the shipment with the identified actual contents of the shipment that was sent from the media storage facility; and
when the comparison determines that the identified actual contents of the shipment are the same as the identified requested contents of the shipment, automatically sending an electronic confirmation of receipt of the requested contents of the shipment;
when the comparison determines that the identified actual contents of the shipment do not include all of the identified requested contents of the shipment, automatically or partially automatically performing an action to obtain requested media components that were not included in the shipment; and,
when the comparison determines that the identified actual contents of the shipment include extra media components that were not a portion of the identified requested contents of the shipment, automatically or partially automatically performing an action to return the extra media components to the offsite media storage facility.

16. The computer-readable medium of claim 15, wherein a bar code reader is used to electronically scan the media components by reading one or more bar code symbols of the media component.

17. The computer-readable medium of claim 15, wherein the report is automatically generated by a provider of the shipment of media components.

18. The computer-readable medium of claim 15, wherein the method further comprises:
reviewing information obtained from the report to determine a possible location of a requested media component that was not included in the shipment.

19. The computer-readable medium of claim 15, wherein the method further comprises:
performing an action to request a refund or credit for an erroneous shipment when the verification component determines that the shipment does not contain all requested media components.

20. The computer-readable medium of claim 15, wherein the method further comprises, when the comparison determines that the identified actual contents of the shipment include extra media components that were not a portion of the identified requested contents of the shipment,
automatically generating shipping materials, and
automatically alerting a carrier to ship the extra media components to a location associated with the offsite media storage facility.

21. The computer-readable medium of claim 15, wherein the method further comprises:
gathering data from a common courier to track locations of media components in transit to the media library, and
providing a graphical user interface to depict currently reported locations of media components in transit.

* * * * *

UNITED STATES PATENT AND TRADEMARK OFFICE
CERTIFICATE OF CORRECTION

PATENT NO. : 8,402,000 B2  
APPLICATION NO. : 12/060169  
DATED : March 19, 2013  
INVENTOR(S) : Parag Gokhale et al.

Page 1 of 1

It is certified that error appears in the above-identified patent and that said Letters Patent is hereby corrected as shown below:

On Title Page, Item (75), under "Inventors", column 1, line 2, delete "Malboro" and insert -- Marlboro --, therefor.

On Title Page 4, Item (56), under "Other Publications", column 2, line 21, delete ""Probablility," and insert -- "Probability, --, therefor.

In the Specification:

In column 2, line 51, delete "operation" and insert -- operation. --, therefor.

In column 11, line 36, delete "FIGS." and insert -- FIG. --, therefor.

Signed and Sealed this  
Ninth Day of July, 2013

Teresa Stanek Rea  
*Acting Director of the United States Patent and Trademark Office*